US012564787B2

(12) United States Patent
Xie

(10) Patent No.: US 12,564,787 B2
(45) Date of Patent: Mar. 3, 2026

(54) VIRTUAL ITEM PROCESSING METHOD AND APPARATUS, ELECTRONIC DEVICE, COMPUTER-READABLE STORAGE MEDIUM, AND COMPUTER PROGRAM PRODUCT

(71) Applicant: Tencent Technology (Shenzhen) Company Limited, Shenzhen (CN)

(72) Inventor: Jieqi Xie, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 241 days.

(21) Appl. No.: 18/227,860

(22) Filed: Jul. 28, 2023

(65) Prior Publication Data

US 2023/0398453 A1 Dec. 14, 2023

Related U.S. Application Data

(63) Continuation of application No. PCT/CN2022/127901, filed on Oct. 27, 2022.

(30) Foreign Application Priority Data

Jan. 21, 2022 (CN) .......................... 202210073879.7

(51) Int. Cl.
  *A63F 13/56* (2014.01)
  *G06T 19/20* (2011.01)
(52) U.S. Cl.
  CPC .............. *A63F 13/56* (2014.09); *G06T 19/20* (2013.01); *G06T 2219/2012* (2013.01)
(58) Field of Classification Search
  CPC ...... A63F 13/56; A63F 13/2145; A63F 13/69; A63F 13/533; G06T 19/20; G06T 2219/2012; G06F 3/0482; G06N 20/00
  See application file for complete search history.

(56) References Cited

U.S. PATENT DOCUMENTS 8,888,598 B2 * 11/2014 Mehta ..................... A63F 13/12
463/42
9,251,318 B2 * 2/2016 Hamilton ................ A63F 13/75
(Continued)

FOREIGN PATENT DOCUMENTS

CN 110201403 A 9/2019
CN 112516583 A 3/2021
(Continued)

OTHER PUBLICATIONS

Tencent Technology, Japanese Office Action, JP Patent Application No. 2024-526941, Jul. 10, 2025, 6 pgs.
(Continued)

*Primary Examiner* — David Tung
(74) *Attorney, Agent, or Firm* — Morgan, Lewis & Bockius LLP

(57) ABSTRACT

This application provides a virtual item processing method performed by an electronic device. The method includes: displaying a virtual scene, the virtual scene comprising an entry to a first virtual item list associated with a first virtual object; displaying the first virtual item list in the virtual scene in response to a trigger operation on the entry to the first virtual item list, the first virtual item list including at least one type of virtual items owned by the first virtual object; and in response to a first selection operation on one type of virtual items in the first virtual item list, discarding at least one virtual item associated with the selected type of virtual items.

15 Claims, 23 Drawing Sheets

(56) References Cited

U.S. PATENT DOCUMENTS

| | | | | |
|---|---|---|---|---|
| 2004/0266505 | A1* | 12/2004 | Keam .................. | A63F 13/533 |
| | | | | 463/1 |
| 2012/0173593 | A1 | 7/2012 | Jogand-Coulomb et al. | |
| 2020/0298123 | A1* | 9/2020 | Yang ...................... | A63F 13/35 |
| 2020/0301578 | A1* | 9/2020 | Guo ................... | G06F 3/04883 |
| 2020/0346113 | A1* | 11/2020 | Sun ...................... | A63F 13/837 |

FOREIGN PATENT DOCUMENTS

| | | | |
|---|---|---|---|
| CN | 113413599 | A | 9/2021 |
| CN | 113546425 | A | 10/2021 |
| CN | 113885731 | A | 1/2022 |
| CN | 114404969 | A | 4/2022 |
| JP | 2015230725 | A | 12/2015 |
| WO | WO 2012096951 | A2 | 7/2012 |
| WO | WO 2020244415 | A1 | 12/2020 |

OTHER PUBLICATIONS

Tencent Technology, ISR, PCT/CN2022/127901, Jan. 12, 2023, 3 pgs.

Tencent Technology, Japanese Office Action, JP Patent Application No. 2024-526941, Jan. 29, 2025, 6 pgs.

Web.archive.org, "[Knives Out] How to Give Items to Friends", Knives Out (Mobile version of Battle Royale) Strategy Team, Feb. 2021, Retrieved from the Internet: https://web.archive.org/web/20211205230431/https://game8.jp/kinives-out/194550.

Tencent Technology, WO, PCT/CN2022/127901, Jan. 12, 2023, 4 pgs.

* cited by examiner

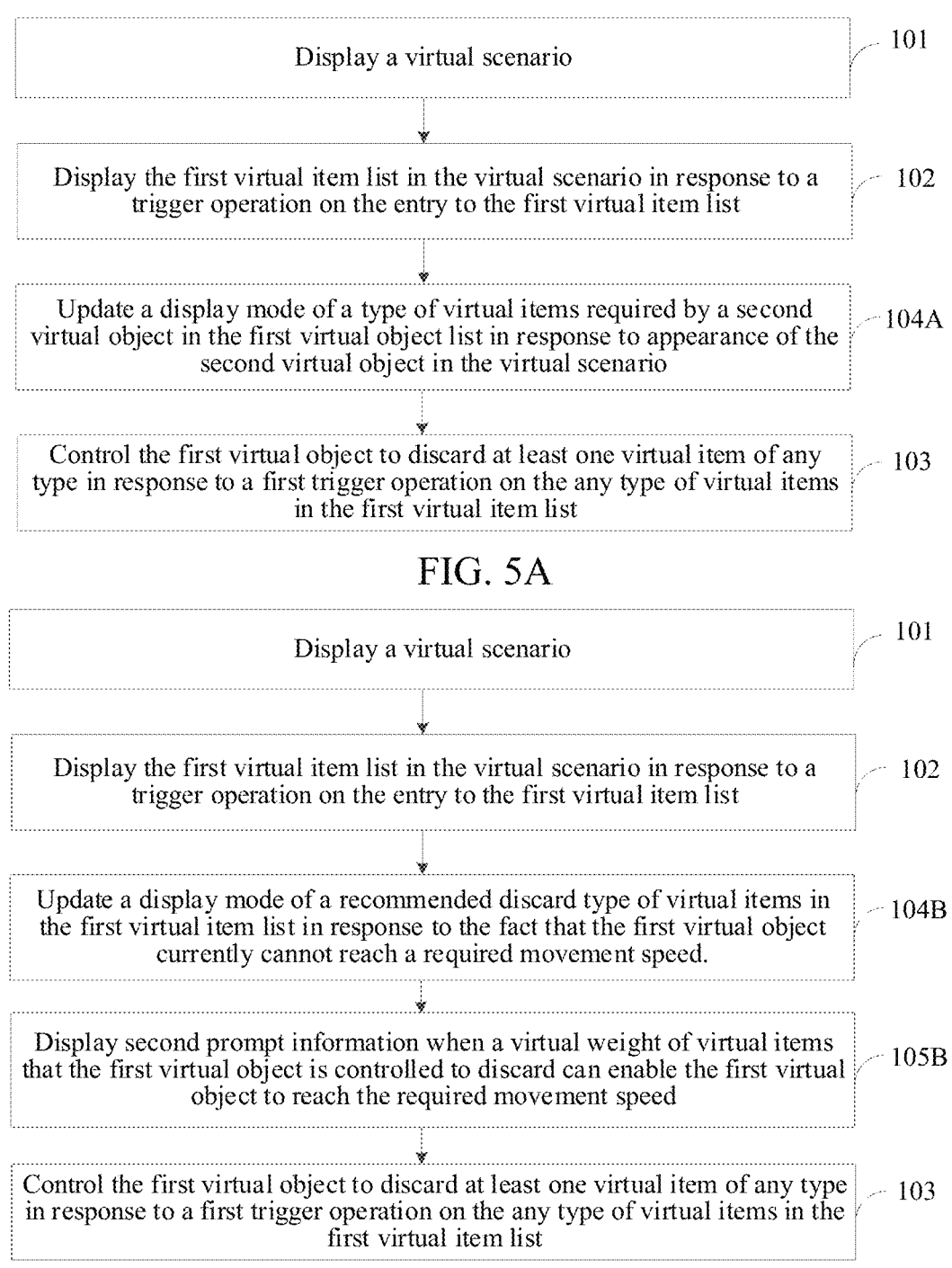

Display a virtual scenario — 101

Display the first virtual item list in the virtual scenario in response to a trigger operation on the entry to the first virtual item list — 102

Update a display mode of a type of virtual items required by a second virtual object in the first virtual object list in response to appearance of the second virtual object in the virtual scenario — 104A Control the first virtual object to discard at least one virtual item of any type in response to a first trigger operation on the any type of virtual items in the first virtual item list — 103

FIG. 5A

Display a virtual scenario — 101

Display the first virtual item list in the virtual scenario in response to a trigger operation on the entry to the first virtual item list — 102

Update a display mode of a recommended discard type of virtual items in the first virtual item list in response to the fact that the first virtual object currently cannot reach a required movement speed. — 104B Display second prompt information when a virtual weight of virtual items that the first virtual object is controlled to discard can enable the first virtual object to reach the required movement speed — 105B Control the first virtual object to discard at least one virtual item of any type in response to a first trigger operation on the any type of virtual items in the first virtual item list — 103

FIG. 5B

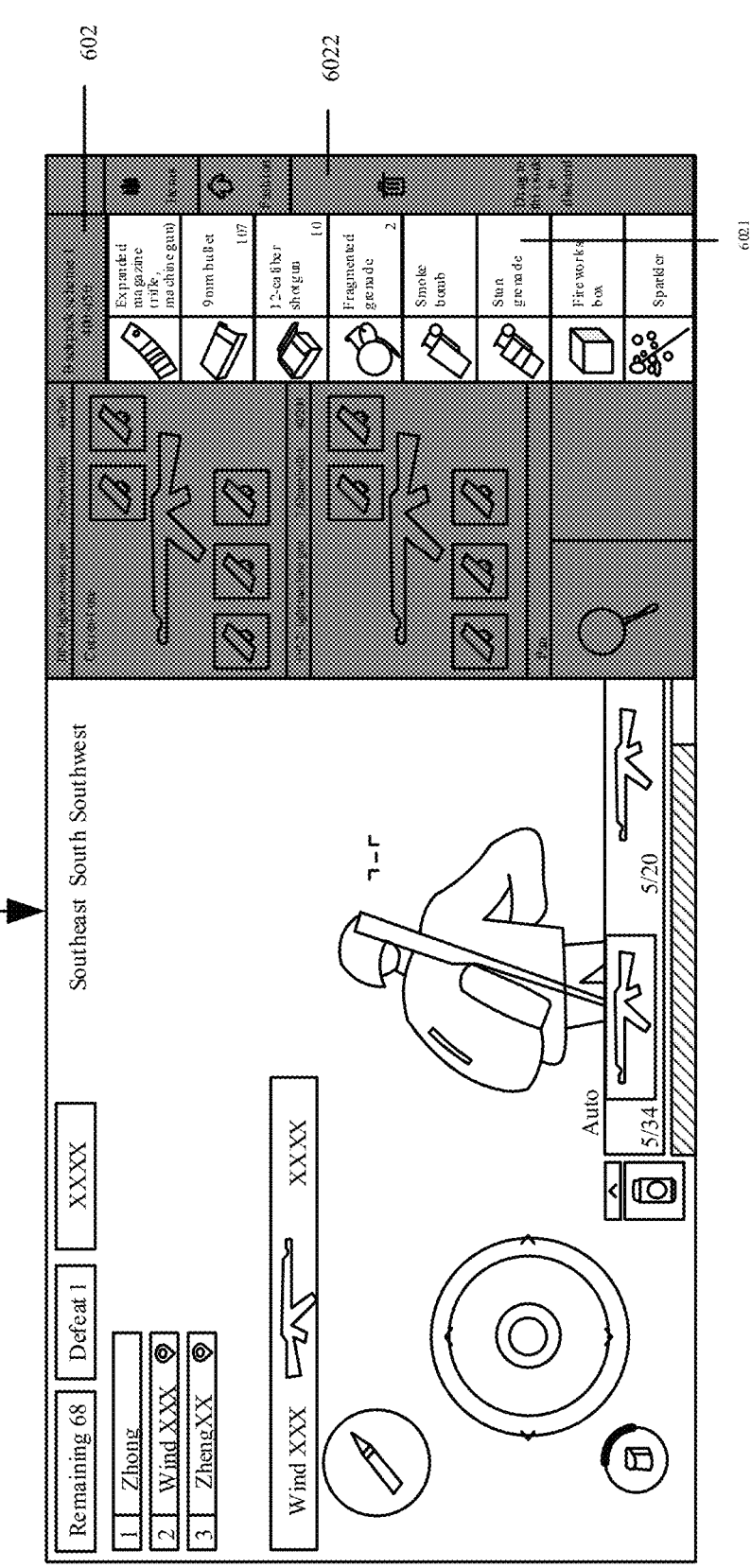
FIG. 6A - continued

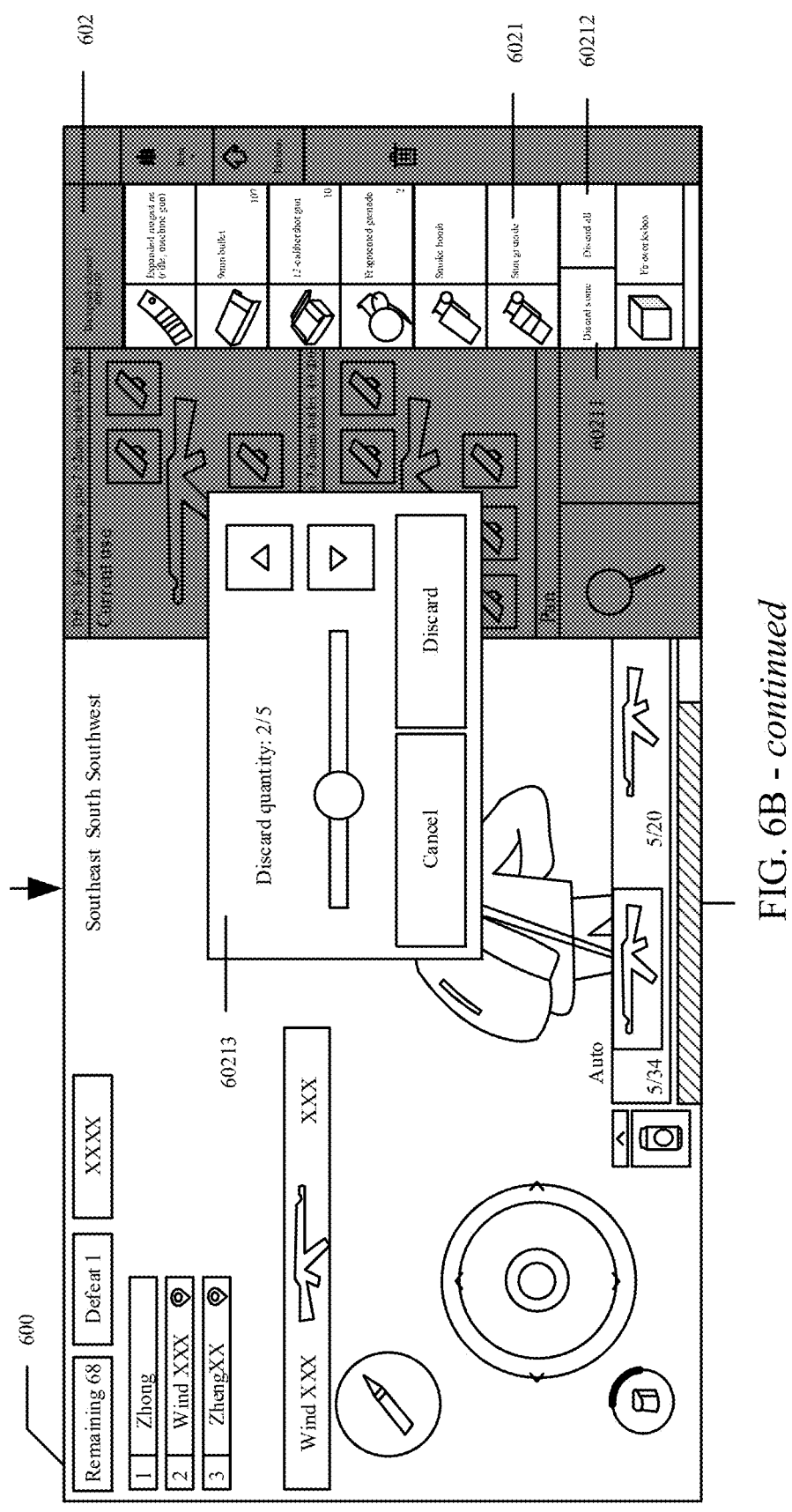
FIG. 6B - continued

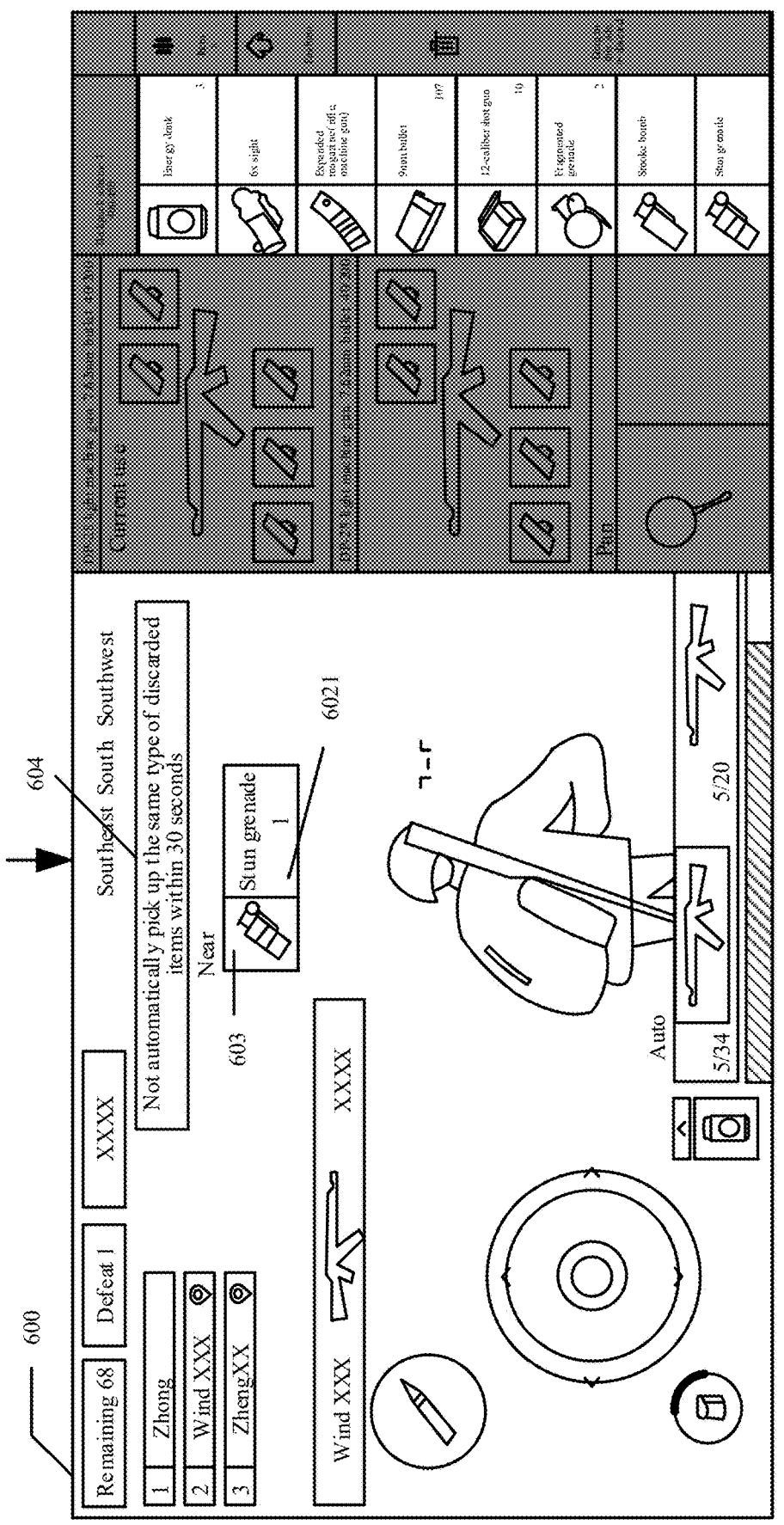
FIG. 6B - continued

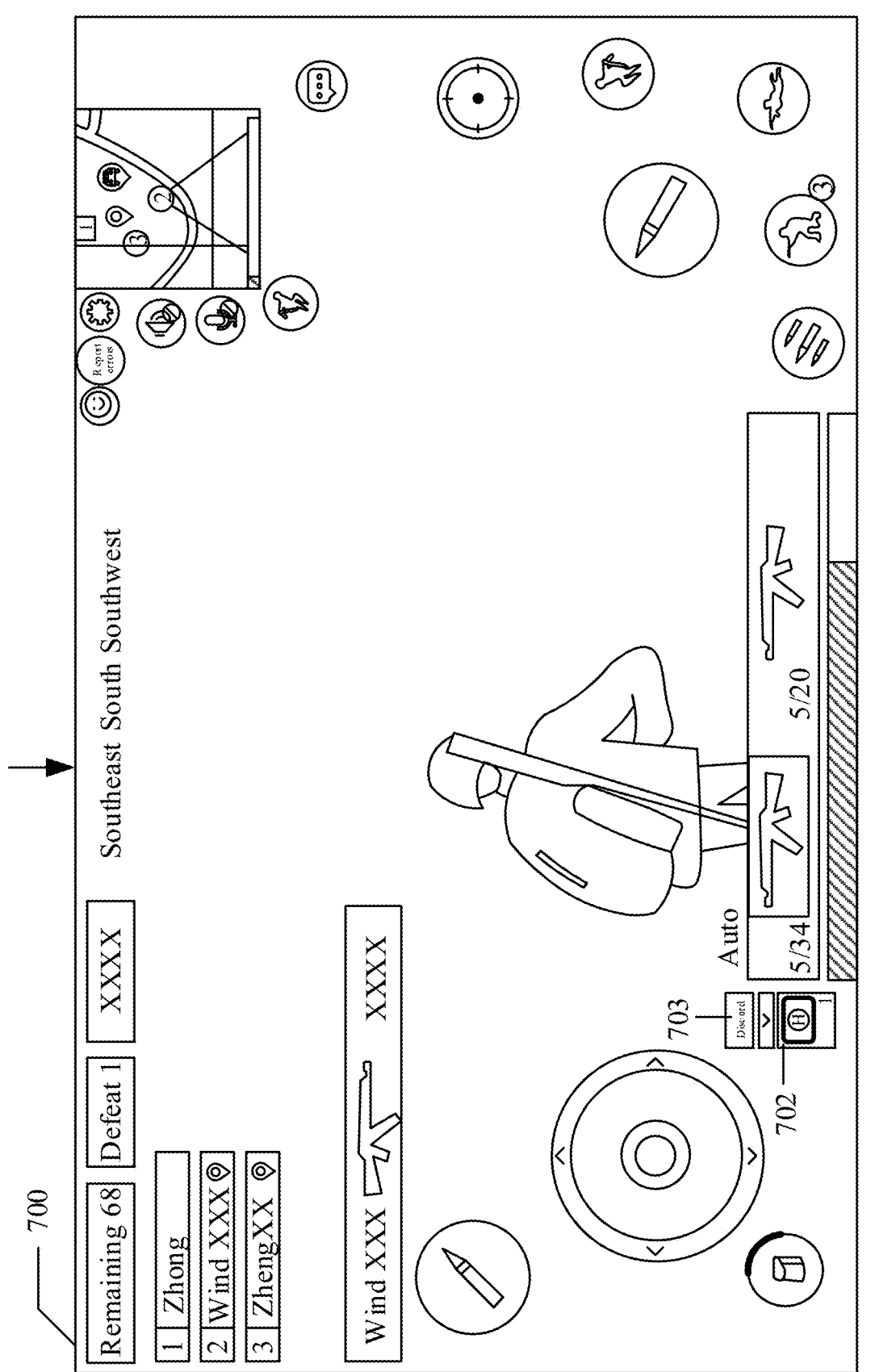
FIG. 7A - continued

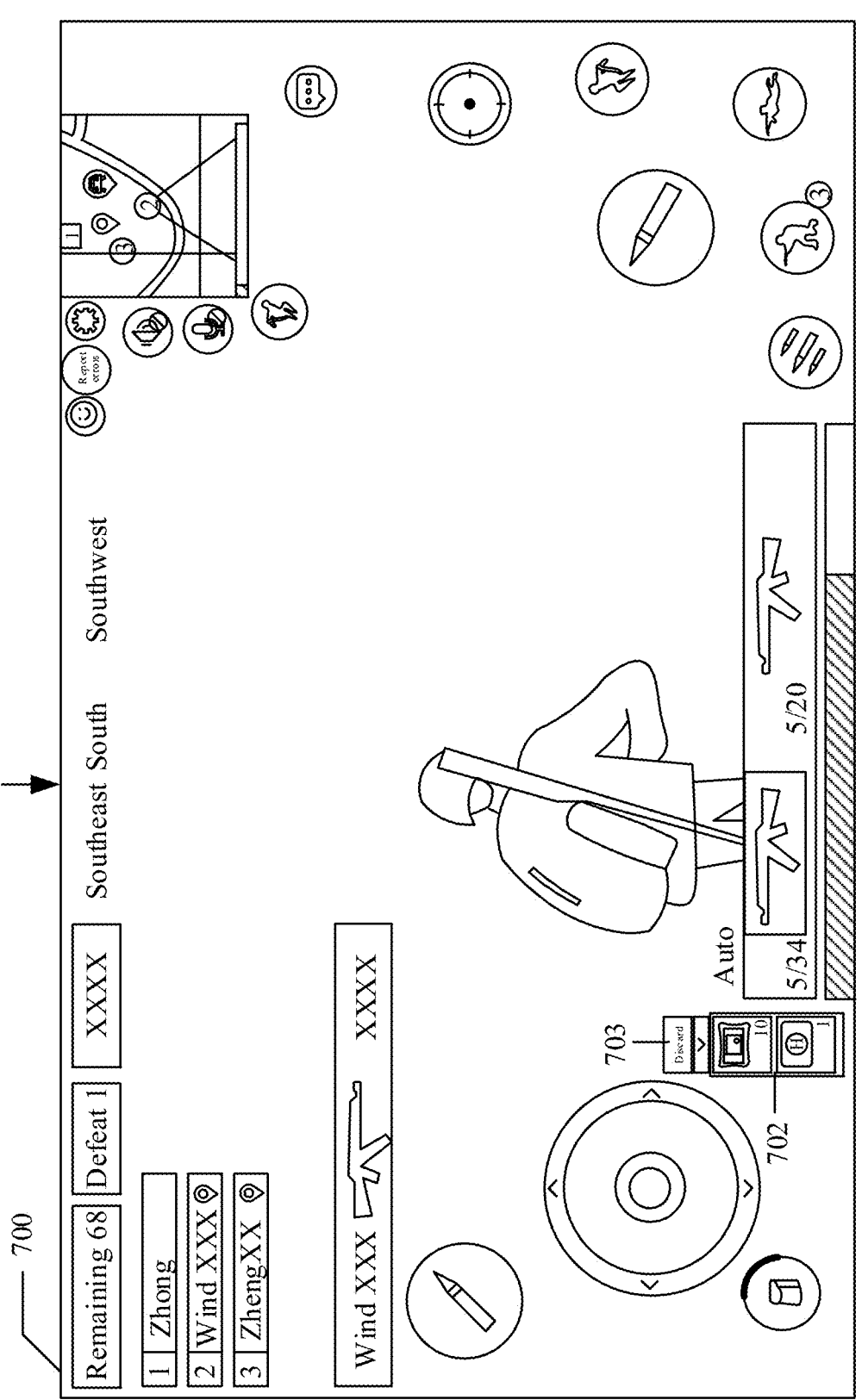
FIG. 7B - continued

VIRTUAL ITEM PROCESSING METHOD AND APPARATUS, ELECTRONIC DEVICE, COMPUTER-READABLE STORAGE MEDIUM, AND COMPUTER PROGRAM PRODUCT

CROSS-REFERENCE TO RELATED APPLICATIONS

This application is a continuation application of PCT Patent Application No. PCT/CN2022/127901, entitled "VIRTUAL ITEM PROCESSING METHOD AND APPARATUS, ELECTRONIC DEVICE, COMPUTER-READABLE STORAGE MEDIUM, AND COMPUTER PROGRAM PRODUCT" filed on Oct. 27, 2022, which is based upon and claims priority to Chinese Patent Application No. 202210073879.7, entitled "VIRTUAL ITEM PROCESSING METHOD AND APPARATUS, ELECTRONIC DEVICE, COMPUTER-READABLE STORAGE MEDIUM, AND COMPUTER PROGRAM PRODUCT" filed on Jan. 21, 2022, all of which is incorporated by reference in its entirety.

FIELD OF THE TECHNOLOGY

This application relates to the field of human-computer interaction technologies, and in particular, to a virtual item processing method and apparatus, an electronic device, a non-transitory computer-readable storage medium, and a computer program product.

BACKGROUND OF THE DISCLOSURE

The display technology based on graphics processing hardware has expanded channels for perceiving an environment and obtaining information. In particular, the display technology for virtual scenes can implement diverse interactions between virtual objects controlled by users or artificial intelligence according to actual application requirements, and has various typical application scenes, for example, can simulate a real combat process between virtual objects in a virtual scene of a game.

With the popularization of information technologies, electronic devices can implement richer and more vivid virtual scenes, typically, such as games. More and more users are participating in virtual scene interactions through electronic devices. For example, in a game, a user may control a virtual object to exchange items with virtual objects controlled by other users, clean virtual items in a backpack, or the like.

However, in solutions provided by relevant technologies, when discarding virtual items, the user first needs to click a backpack button to enter a backpack interface, then select virtual items to be discarded in the backpack interface, and select a discard quantity before discarding.

It may be seen that the solutions provided by the relevant technologies require the user to operate many steps when discarding virtual items, resulting in low human-computer interaction efficiency.

SUMMARY

Embodiments of this application provide a virtual item processing method and apparatus, an electronic device, a non-transitory computer-readable storage medium, and a computer program product, which can simplify operation processes when a user controls a virtual object to discard virtual items, thereby improving human-computer interaction efficiency in a process of discarding virtual items.

Technical solutions in the embodiments of this application are implemented as follows:

An embodiment of this application provides a virtual item processing method, performed by an electronic device, and including:

displaying a virtual scene, the virtual scene comprising an entry to a first virtual item list associated with a first virtual object;

displaying the first virtual item list in the virtual scene in response to a trigger operation on the entry to the first virtual item list, the first virtual item list including at least one type of virtual items owned by the first virtual object; and in response to a first selection operation on one type of virtual items in the first virtual item list, discarding at least one virtual item associated with the selected type of virtual items.

An embodiment of this application provides an electronic device, including:

a memory, configured to store executable instructions; and a processor, configured to implement the virtual item processing method according to the embodiments of this application when executing the executable instructions stored in the memory.

An embodiment of this application provides a non-transitory computer-readable storage medium, storing executable instructions that, when executed by a processor, implement the virtual item processing method according to the embodiments of this application.

An embodiment of this application provides a computer program product, storing a computer program or instructions that, when executed by a processor, implement the virtual item processing method according to the embodiments of this application.

The embodiments of this application have the following beneficial effects:

An entry to a virtual item list is set in a virtual scene, the virtual item list is displayed in the virtual scene upon receiving a trigger operation on the entry to the virtual item list, and then a first virtual object is controlled to discard at least one virtual item of any type upon receiving a trigger operation on any type of virtual items in the virtual item list. In this case, virtual items can be quickly discarded only in the virtual scene, and operation processes when a user controls a virtual object to discard virtual items are simplified, thereby improving human-computer interaction efficiency.

BRIEF DESCRIPTION OF THE DRAWINGS

FIG. 5A and FIG. 5B are schematic flowcharts of a virtual item processing method according to an embodiment of this application.

DESCRIPTION OF EMBODIMENTS

Figure 1A:
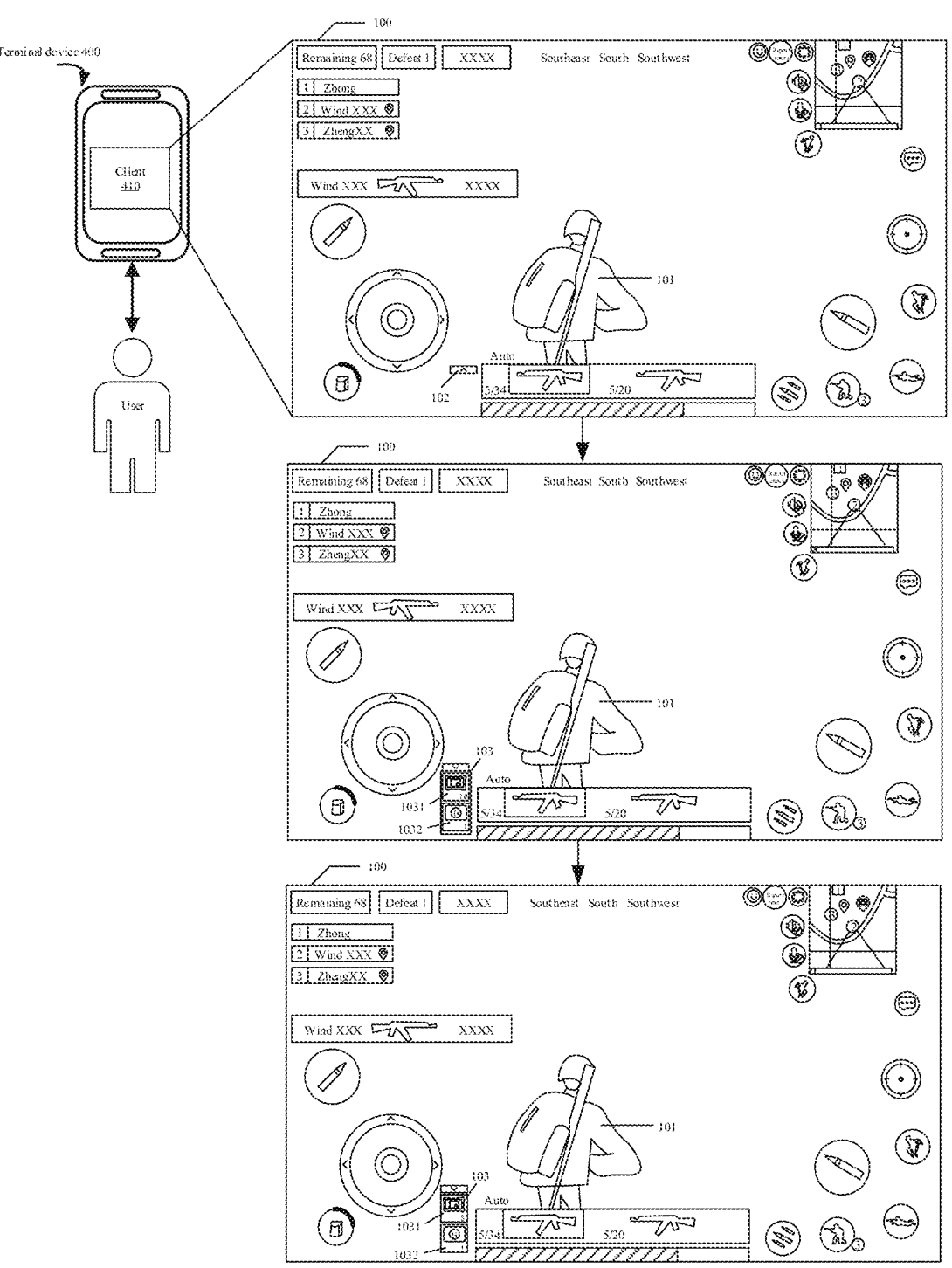
FIG. 1A is a schematic diagram of an application mode of a virtual item processing method according to an embodiment of this application.

To make the objectives, technical solutions, and advantages of this application clearer, the following describes this application in further detail with reference to the accompanying drawings. The described embodiments are not to be considered as a limitation to this application. All other embodiments obtained by a person of ordinary skill in the art without creative efforts shall fall within the protection scope of this application.

In the following description, the term "some embodiments" describes subsets of all possible embodiments, but it may be understood that "some embodiments" may be the same subset or different subsets of all the possible embodiments, and may be combined with each other without conflict.

It may be understood that, in the embodiments of this application, relevant data such as user information need to obtain user permission or consent when the embodiments of this application are applied to specific products or technologies, and the collection, use, and processing of the relevant data need to comply with relevant laws, regulations, and standards of relevant countries and regions.

In the following description, the terms "first, second . . . " merely distinguish similar objects, and do not represent a specific order of the objects. It may be understood that the terms "first, second . . . " may be interchanged in a specific order or a consecutive order, so that the embodiments of this application described here can be implemented in other order besides that illustrated or described here.

In the following description, the term "plurality" refers to at least two.

Unless otherwise defined, meanings of all technical and scientific terms used in this specification are the same as those usually understood by a person skilled in the art to which this application belongs. The terms used in the specification are merely intended to describe objectives of the embodiments of this application, but are not intended to limit this application.

Before the embodiments of this application are further described in detail, a description is made on nouns and terms in the embodiments of this application, and the nouns and terms in the embodiments of this application are applicable to the following explanations.

1) In response to: This term is used for representing a condition or status on which the performed operation depends. When the dependent condition or status is satisfied, one or more of the performed operations may be real-time or have a set delay. Unless otherwise specified, there is no restriction on the order of a plurality of performed operations.

2) Virtual scene: It is a scene displayed (or provided) when a game program is running on a terminal device. The scene may be a simulated environment of the real world, a semi-simulated and semi-fictional environment, or an entirely fictional virtual environment. The virtual scene may be any of a two-dimensional virtual scene, a 2.5-dimensional virtual scene, or a three-dimensional virtual scene. The embodiments of this application do not limit dimensions of the virtual scene. For example, the virtual scene may include sky, land, ocean, or the like, and the land may include environmental elements such as deserts and cities. A user may control a virtual object to move in the virtual scene.

3) Virtual object: Images of various people and objects that may interact in a virtual scene, or movable objects in a virtual scene. The movable objects may be virtual characters, virtual animals, cartoon characters, and the like, such as characters and animals displayed in the virtual scene. The virtual object may be a virtual image used for representing a user in the virtual scene. The virtual scene may include a plurality of virtual objects, and each virtual object has a shape and a volume in the virtual scene, and occupies some space in the virtual scene.

(4) Scene data: Scene data represent feature data of a virtual scene, such as area of a construction region in a virtual scene, or a current architectural style of a virtual scene. The scene data may alternatively include a location of a virtual building in a virtual scene, floor area of the virtual building, and the like.

5) Virtual item: Various types of items that may be used by virtual objects in a virtual scene, such as virtual drugs and virtual drinks used for restoring status parameters of virtual objects (such as a health value and a stamina value), as well as virtual weapons used for attacking other objects in the virtual scene, such as virtual grenades and virtual firearms.

Embodiments of this application provide a virtual item processing method and apparatus, an electronic device, a non-transitory computer-readable storage medium, and a computer program product, which can simplify operation processes when a user controls a virtual object to discard virtual items, thereby improving efficiency of discarding virtual items in a virtual scene. In order to facilitate easier understanding of the virtual item processing method provided in the embodiments of this application, an exemplary implementation scene of the virtual item processing method provided in the embodiments of this application is first explained. A virtual scene in the virtual item processing method provided in the embodiments of this application may be entirely based on output of a terminal device or collaborative output of a terminal device and a server.

In some embodiments, the virtual scene may be an environment for interaction between virtual objects (such as game characters), for example, game characters may fight in the virtual scene. The game characters may be controlled to interact with each other in the virtual scene, so as to relieve user's life pressure in a game process.

In an implementation scene, refer to FIG. 1A. FIG. 1A is a schematic diagram of an application mode of a virtual item processing method according to an embodiment of this application. The virtual item processing method is applicable to some application modes that completely rely on computing power of graphics processing hardware of terminal devices 400 to complete relevant data computation of a virtual scene 100, such as single-player/off-line games. Output of the virtual scene is completed through various types of terminal devices 400 such as a smart phone, a tablet computer and a virtual reality/augmented reality device.

For example, types of the graphics processing hardware include a central processing unit (CPU) and a graphics processing unit (GPU).

When visual perception of the virtual scene 100 is formed, the terminal device 400 computes data required for display through the graphics computing hardware, and completes loading, parsing, and rendering of the displayed data. The graphics output hardware outputs video frames that may form visual perception of the virtual scene, for example, a display screen of a smart phone presents two-dimensional video frames, or lenses of augmented reality/virtual reality glasses project video frames of a three-dimensional display effect. Moreover, in order to enrich the perception effect, the terminal device 400 may further form one or more of auditory perception, tactile perception, motion perception, and taste perception by means of different hardware.

For example, a client 410 (such as a standalone game application) is run on the terminal device 400. During running of the client 410, a virtual scene including role-playing is output. The virtual scene may be an environment for interaction between game characters, such as a plain, a street, or a valley for fight of the game characters. The virtual scene 100 displayed from a third-person perspective is used as an example. A first virtual object 101 is displayed in the virtual scene 100, where the first virtual object 101 may be a game character controlled by a user, that is, the first virtual object 101 is controlled by a real user, and moves in the virtual scene 100 in response to an operation of the real user on a controller (such as a touch screen, a voice switch, a keyboard, a mouse, or a joystick). For example, when the real user moves the joystick (including a virtual joystick or a real joystick) to the right, the first virtual object 101 moves to the right in the virtual scene 100. The first virtual object 101 may alternatively be controlled to remain stationary, jump, shoot, and the like.

For example, the first virtual object 101 and an entry 102 to a first virtual item list are displayed in the virtual scene 100. When the client 410 receives a user's trigger operation (such as a click operation) on the entry 102 to the first virtual item list, the first virtual item list 103 is displayed in the virtual scene 100. The first virtual item list 103 includes at least one type of virtual items owned by the first virtual object 101, for example, includes "bandage" 1031 and "medical kit" 1032, where a remaining quantity of "bandage" is 10, and a remaining quantity of "medical kit" is 1. Subsequently, when the client 410 receives a user's first selection operation on the "bandage" 1031 (such as a click operation or a drag operation on the "bandage" 1031) displayed in the first virtual item list 103, the client controls the first virtual object 101 to discard at least one (such as 2) "bandage". In this case, the remaining quantity of "bandage" 1031 displayed in the first virtual item list 103 is updated from 10 to 8. In this case, virtual items can be discarded only in the virtual scene, and operation processes when the user controls the virtual object to discard virtual items are simplified, thereby improving efficiency of discarding virtual items in the virtual scene.

Figure 1B:
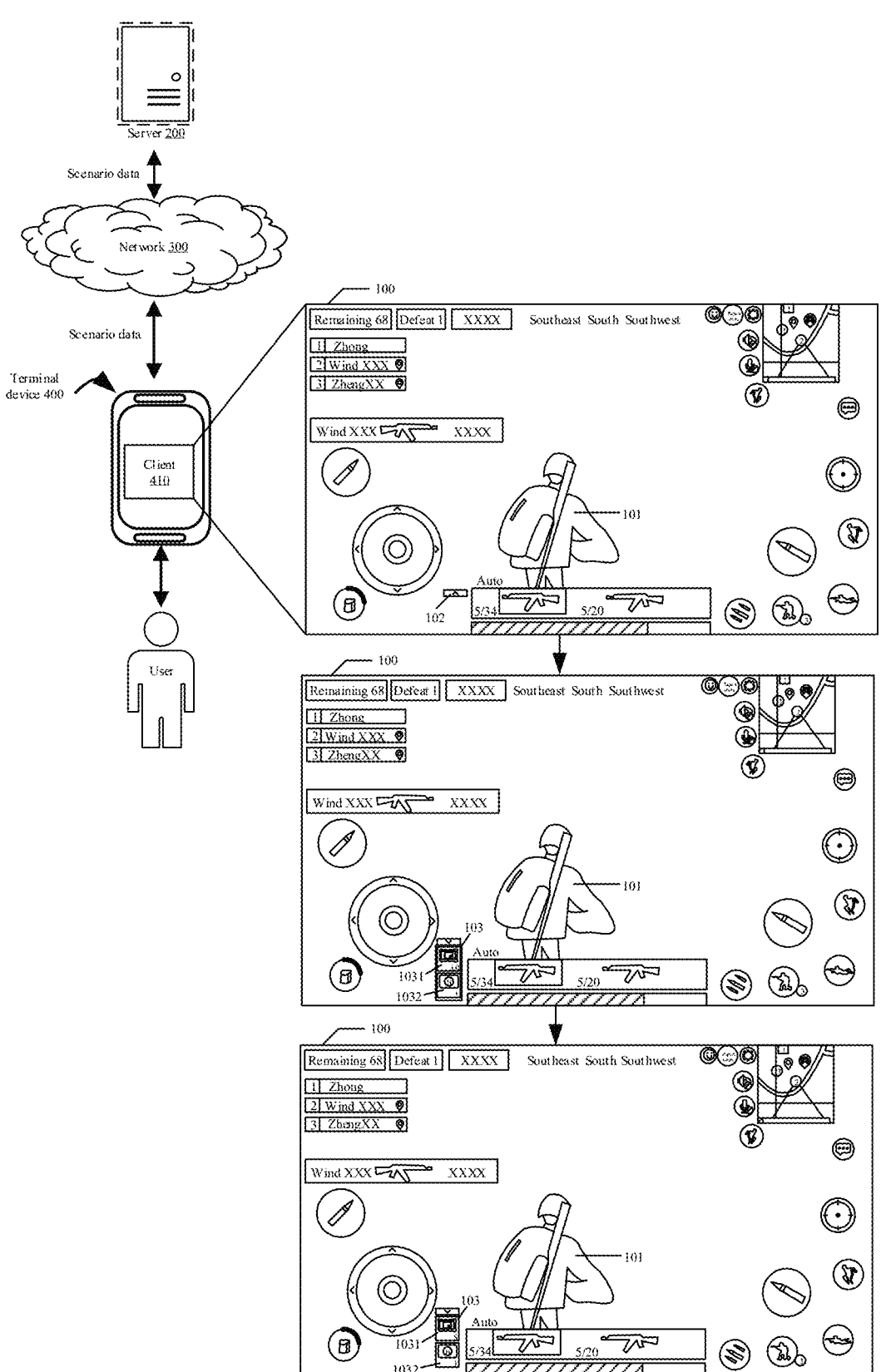
FIG. 1B is a schematic diagram of an application mode of a virtual item processing method according to an embodiment of this application.

In another implementation scene, refer to FIG. 1B. FIG. 1B is a schematic diagram of an application mode of a virtual item processing method according to an embodiment of this application. The virtual item processing method is applied to a terminal device 400 and a server 200, and is suitable for an application mode in which computation of a virtual scene is completed by means of computing power of the server 200 and the terminal device 400 outputs the virtual scene.

Visual perception for forming a virtual scene 100 is used as an example. The server 200 computes virtual scene related display data (such as scene data) and sends the data to the terminal device 400 through a network 300. The terminal device 400 relies on graphics computing hardware to load, parse, and render the computed display data, and relies on graphics output hardware to output a virtual scene, so as to form visual perception. For example, a display screen of a smart phone presents two-dimensional video frames, or lenses of augmented reality/virtual reality glasses project video frames of a three-dimensional display effect. It may be understood that the perception of the virtual scene may be output by means of corresponding hardware of the terminal device 400, for example, auditory perception is formed by using a microphone, and tactile perception is formed by using a vibrator.

For example, a client 410 (such as an on-line game application) is run on the terminal device 400, and is connected to the server 200 (such as a game server) to interact with other users for a game. The terminal device 400 outputs a virtual scene 100 of the client 410. The virtual scene 100 displayed from a third-person perspective is used as an example. A first virtual object 101 is displayed in the virtual scene 100, where the first virtual object 101 may be a game character controlled by a user, that is, the first virtual object 101 is controlled by a real user, and moves in the virtual scene 100 in response to an operation of the real user on a controller (such as a touch screen, a voice switch, a keyboard, a mouse, or a joystick). For example, when the real user moves the joystick to the right, the first virtual object 101 moves to the right in the virtual scene 100. The first virtual object 101 may alternatively be controlled to remain stationary, jump, shoot, and the like.

For example, the first virtual object 101 and an entry 102 to a first virtual item list are displayed in the virtual scene 100. When the client 410 receives a user's trigger operation (such as a click operation) on the entry 102 to the first virtual item list, the first virtual item list 103 is displayed in the virtual scene 100. The first virtual item list 103 includes at least one type of virtual items owned by the first virtual object 101, for example, includes "bandage" 1031 and "medical kit" 1032, where a remaining quantity of "bandage" is 10, and a remaining quantity of "medical kit" is 1. Subsequently, when the client 410 receives a user's first selection operation on the "bandage" 1031 (such as a click operation or a drag operation on the "bandage" 1031) displayed in the first virtual item list 103, the client controls the first virtual object 101 to discard at least one (such as 2) "bandage". In this case, the remaining quantity of "bandage" 1031 displayed in the first virtual item list 103 is updated from 10 to 8. In this case, virtual items can be discarded only in the virtual scene, and operation processes when the user controls the virtual object to discard virtual items are simplified, thereby improving efficiency of discarding virtual items in the virtual scene.

In some embodiments, the terminal device 400 may alternatively implement the virtual item processing method provided in the embodiments of this application by running a computer program. For example, the computer program may be a native program or software module in an operating system; a native application (APP), namely, a program that needs to be installed in an operating system to run, such as a shooting game APP (namely, the aforementioned client 410); a mini program, namely, a program that only needs to be downloaded into a browser environment to run; or a game mini program that can be embedded into any APP. In summary, the foregoing computer program may be any form of application, module, or plug-in.

A computer program is used as an example. During actual implementation, the terminal device 400 is installed with and runs an application that supports a virtual scene. The application may be any one of a first-person shooting game (FPS), a third-person shooting game, a virtual reality application, a three-dimensional map program, or a multi-player gunfight survival game. The user uses the terminal device 400 to operate the virtual object located in the virtual scene for activities, including but not limited to: at least one of adjusting body posture, crawling, walking, running, riding, jumping, driving, picking up, shooting, attacking, throwing, and constructing a virtual building. For example, the virtual object may be a virtual character, such as a simulated character or cartoon character.

In other embodiments, this embodiment of this application may alternatively be implemented by means of cloud technology. The cloud technology refers to a hosting technology that unifies a series of resources such as hardware, software, and networks within a wide area network or a local area network to compute, store, process, and share data.

The cloud technology is a general term of a network technology, an information technology, an integration technology, a management platform technology, an application technology, and the like based on cloud computing business model applications, and may form a resource pool for use as needed, with flexibility and convenience. The cloud computing technology will become an important support. Back-end services of a technical network system require mass computing and storage resources.

For example, the server 200 shown in FIG. 1B may be an independent physical server, or a server cluster or distributed system including a plurality of physical servers, or a cloud server providing basic cloud computing services such as cloud services, cloud databases, cloud computation, cloud functions, cloud storage, network services, cloud communications, middleware services, domain name services, security services, content delivery networks (CDN), big data, and artificial intelligence platforms. The terminal device 400 may be a smart phone, a tablet computer, a notebook computer, a desktop computer, a smart speaker, a smart watch, an intelligent interaction device, a vehicle-mounted terminal, or the like, but is not limited thereto. The terminal device 400 and the server 200 may be directly or indirectly connected through wired or wireless communication, which is not limited in the embodiments of this application.

Figure 2:
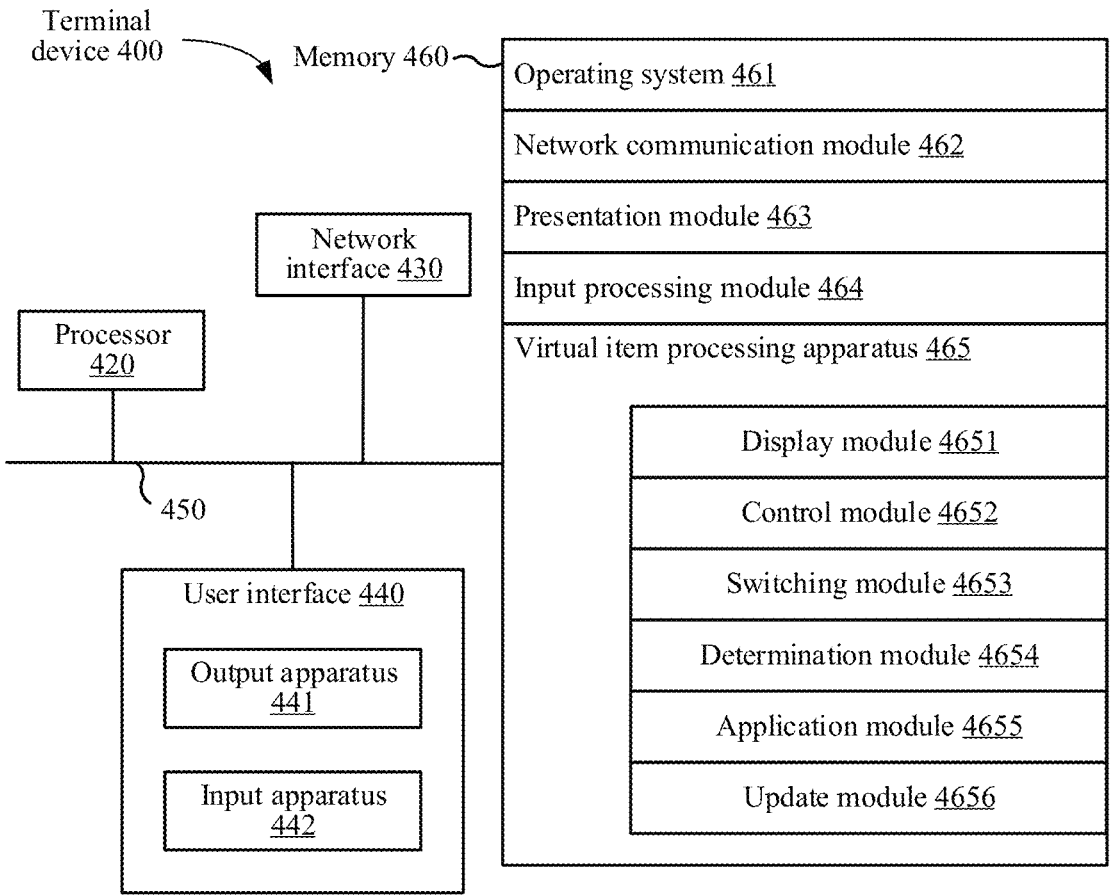
FIG. 2 is a schematic structural diagram of a terminal device 400 according to an embodiment of this application.

A structure of the terminal device 400 shown in FIG. 1A will be explained below. Refer to FIG. 2. FIG. 2 is a schematic structural diagram of a terminal device 400 according to an embodiment of this application. The terminal device 400 shown in FIG. 2 includes: at least one processor 420, a memory 460, at least one network interface 430, and a user interface 440. Components in the terminal device 400 are coupled together through a bus system 450. It may be understood that the bus system 450 is configured to implement connection and communication between the components. In addition to a data bus, the bus system 450 further includes a power bus, a control bus, and a status signal bus. However, for clarity of description, various buses are marked as the bus system 450 in FIG. 2.

The processor 420 may be an integrated circuit chip with signal processing capability, such as a general purpose processor, a digital signal processor (DSP), or another programmable logic device, discrete gate or transistor logic device, or a discrete hardware assembly, where the general purpose processor may be a microprocessor, any conventional processor, or the like.

The user interface 440 includes one or more output apparatuses 441 capable of presenting media content, including one or more speakers and/or one or more visual displays. The user interface 440 further includes one or more input apparatuses 442, including user interface components that facilitate user input, such as a keyboard, a mouse, a microphone, a touch screen display, a camera, or another input button or control.

The memory 460 may be removable, non-removable, or a combination thereof. Exemplary hardware devices include a solid-state memory, a hard disk drive, an optical disk drive, and the like. The memory 460 includes one or more storage devices physically away from the processor 420.

The memory 460 includes a volatile memory or a non-volatile memory, or may include both a volatile memory and a non-volatile memory. The non-volatile memory may be a read only memory (ROM), and the volatile memory may be a random access memory (RAM). The memory 460 described in this embodiment of this application aims to include any suitable type of memories.

In some embodiments, the memory 460 can store data to support various operations. Examples of these data include programs, modules, and data structures, or subsets or supersets thereof, as exemplified below.

An operating system 461 includes system programs for processing various basic system services and performing hardware-related tasks, for example, a frame layer, a core library layer, and a drive layer for implementing various basic services and processing hardware-based tasks.

A network communication module 462 is configured to access other computing devices through one or more (wired or wireless) network interfaces 430. Exemplary network interfaces 430 include: Bluetooth, wireless fidelity (WiFi), a universal serial bus (USB), and the like.

A presentation module 463 is configured to present information (such as user interfaces for operating peripheral devices and displaying content and information) via one or more output apparatuses 441 (such as a display and a speaker) associated with the user interface 440.

An input processing module 464 is configured to detect one or more user inputs or interactions from the one or more input apparatuses 442 and translate the detected inputs or interactions.

In some embodiments, a virtual item processing apparatus provided in this embodiment of this application may be implemented in a software manner. FIG. 2 shows a virtual item processing apparatus 465 stored in the memory 460. The virtual item processing apparatus may be software in a form of a program, a plug-in, or the like, and includes the following software modules: a display module 4651, a control module 4652, a switching module 4653, a determination module 4654, an application module 4655, and an update module 4656. These modules are logical modules, and therefore may be combined or further split according to the implemented functions. In FIG. 2, for the convenience of expression, all the foregoing modules are shown at one time, but the virtual item processing apparatus 465 excludes the implementation that may include only the display module 4651 and the control module 4652. Functions of the modules will be explained below.

The virtual item processing method provided in the embodiments of this application will be described below with reference to the accompanying drawings. The virtual item processing method provided in the embodiments of this application may be performed by the terminal device 400 in FIG. 1A alone, or collaboratively performed by the terminal device 400 and the server 200 in FIG. 1B.

Figure 3:
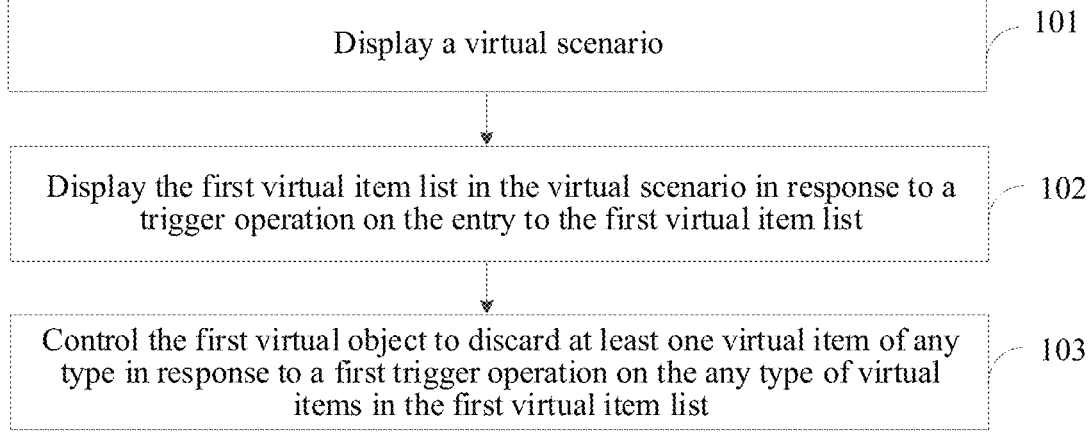
FIG. 3 is a schematic flowchart of a virtual item processing method according to an embodiment of this application.

The following describes an example that the virtual item processing method provided in the embodiments of this application is performed by the terminal device 400 in FIG. 1A alone. Refer to FIG. 3. FIG. 3 is a schematic flowchart of a virtual item processing method according to an embodiment of this application. The method will be described with reference to FIG. 3.

The method shown in FIG. 3 may be performed by various forms of computer programs running on the terminal device 400, which are not limited to the foregoing client 410 and may alternatively be the foregoing operating system 461, software modules, and scripts. Therefore, the client is not considered as limiting the embodiments of this application.

In step 101, display a virtual scene.

Here, the virtual scene includes a first virtual object and an entry to a first virtual item list.

In some embodiments, a client supporting a virtual scene is installed on a terminal device (for example, when the virtual scene is a game, the corresponding client may be a game APP, such as a shooting game APP or a multi-player online tactical competition game APP). When a user opens the client installed on the terminal device (for example, the user clicks an icon corresponding to a shooting game APP displayed on a user interface of the terminal device), and when the terminal device runs the client, a first virtual object (for example, virtual object A controlled by user 1) and an entry to a first virtual item list in the virtual scene may be displayed on a human-computer interaction interface of the client.

In some embodiments, in the human-computer interaction interface of the client, the virtual scene may be displayed from a first-person perspective (for example, the virtual object in the game may be played from a user's own perspective); the virtual scene may be displayed from a third-person perspective (for example, the user chases the virtual object in the game to play); or the virtual scene may be displayed from a bird's-eye perspective. The foregoing different perspectives may be switched arbitrarily.

As an example, the first virtual object may be an object controlled by the current user in the game. Alternatively, the virtual scene may include other virtual objects, such as virtual objects that may be controlled by other users or robot programs. The virtual objects may be divided into any of a plurality of camps, the camps may have hostile or collaborative relationships, and the camps in the virtual scene may include one or two of the relationships.

The virtual scene is displayed from the first-person perspective as an example, and displaying a virtual scene in a human-computer interaction interface may include: determining a field of view region of a first virtual object according to a viewing position and a field of view of the first virtual object in a complete virtual scene, and displaying a partial virtual scene of the complete virtual scene in the field of view region, that is, the displayed virtual scene may be a partial virtual scene relative to the complete virtual scene. Because the first-person perspective is the most powerful viewing perspective for the user, the user can immerse in the operation process.

The virtual scene is displayed from a bird's-eye perspective as an example, and displaying the virtual scene in the human-computer interaction interface may include: in response to a scaling operation on a panoramic virtual scene, displaying a partial virtual scene corresponding to the scaling operation in the human-computer interaction interface, that is, the displayed virtual scene may be a partial virtual scene relative to the panoramic virtual scene. In this way, user's operability in the operation process can be improved, thereby improving human-computer interaction efficiency.

In step 102, display the first virtual item list in the virtual scene in response to a trigger operation on the entry to the first virtual item list.

Here, the first virtual item list includes at least one type of virtual items owned by the first virtual object. For example, all types of virtual items owned by the first virtual object may be displayed in the first virtual item list. Alternatively, virtual items with usage frequencies greater than frequency thresholds may be first determined from all types of virtual items owned by the first virtual object, and the virtual items with the usage frequencies greater than the frequency thresholds may be displayed in the first virtual item list.

For example, the first virtual object is virtual object A controlled by user 1. Assuming that virtual object A holds five different types of virtual items, respectively "bandage", "medical kit", "energy drink", "grenade", and "sight", the five different types of virtual items may be displayed simultaneously in the first virtual item list. Alternatively, only virtual items with usage frequencies greater than frequency thresholds may be displayed in the first virtual item list. For example, assuming that the usage frequencies of "bandage" and "medical kit" are greater than frequency thresholds, only the "bandage" and "medical kit" may be displayed in the first virtual item list.

Alternatively, virtual items having the same function among all types of virtual items owned by the first virtual object may be displayed in the first virtual item list (for example, the types of the first virtual item list may include: a drug light, a missile list, and the like). For example, the types of the virtual items owned by the first virtual object include: "bandage", "medical kit", "energy drink", "grenade", and "sight", where "bandage", "medical kit", and "energy drink" can all be used for restoring the health value of the first virtual object. Then, "bandage", "medical kit", and "energy drink" may be displayed in the first virtual item list. The embodiments of this application do not limit the types of the virtual items displayed in the first virtual item list.

In some embodiments, the first virtual item list may have multiple different statuses, such as a discard status and a usage status, where the discard status is a status in which any type of virtual items is selected for discard, and the usage status is a status in which any type of virtual items is selected for use. In response to a trigger operation on the entry to the first virtual item list, the client may further perform the following processing: displaying a status control, where the status control is used for, when triggered, switching the status of the first virtual item list (for example, assuming that the current status of the first virtual item list is a discard status, and when a user's click operation on the status control is received, the status of the first virtual item list is switched from the discard status to a usage status; and when a user's click operation on the status control is received again, the status of the first virtual item list is switched back from the usage status to the discard status), and representing different statuses in a differential display mode, for example, different statuses of the first virtual item list are distinguished and displayed in different manners of colors, sizes, or text prompts (for example, displaying "Discard" or "Use" prompt text).

Figure 4A:
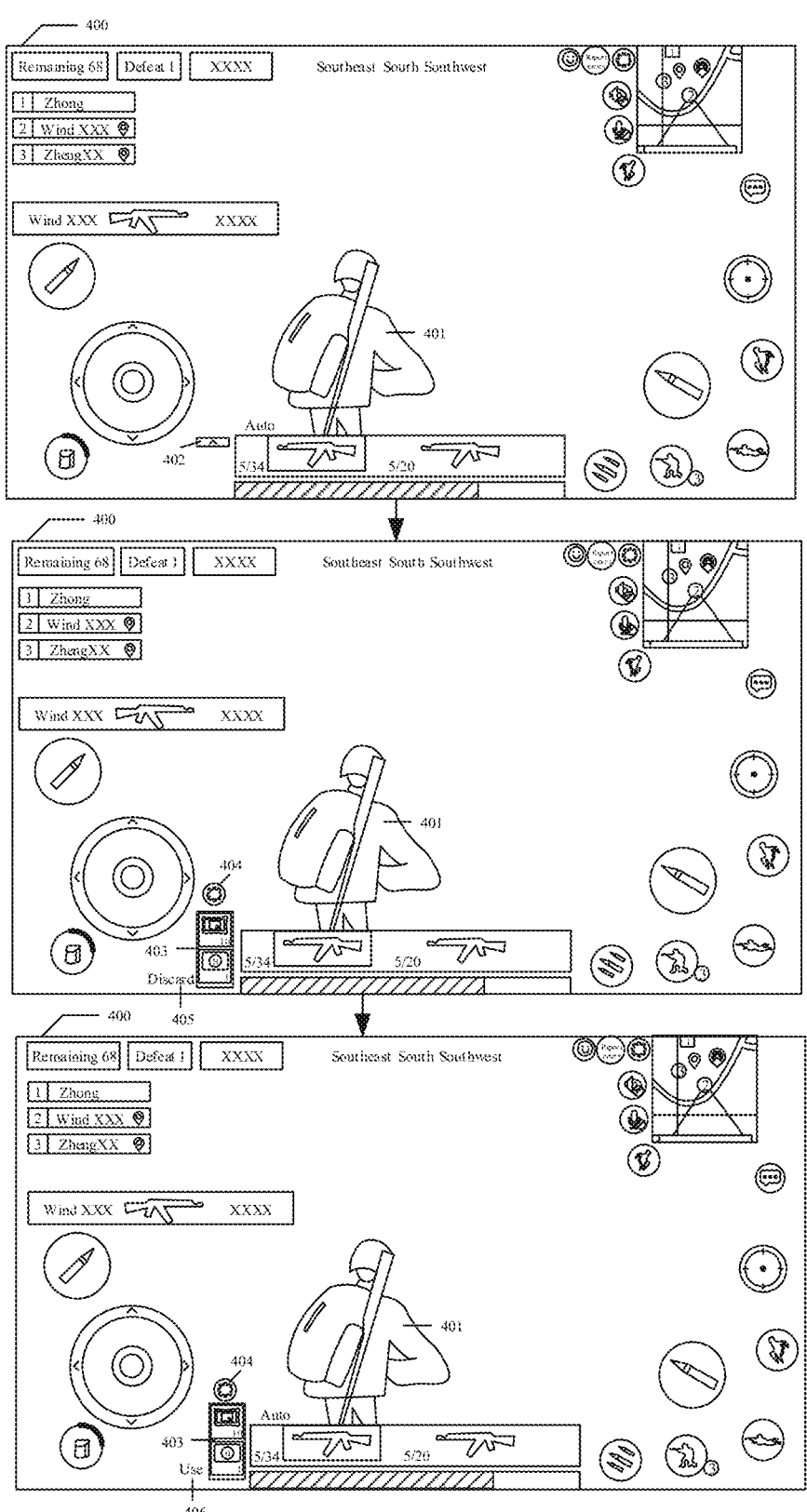
FIG. 4A to FIG. 4D are schematic diagrams of application scenes of a virtual item processing method according to an embodiment of this application.

For example, refer to FIG. 4A. FIG. 4A is a schematic diagram of an application scene of a virtual item processing method according to an embodiment of this application. As shown in FIG. 4A, a first virtual object 401 and an entry 402 to a first virtual item list are displayed in a virtual scene 400. When a user's click operation on the entry 402 to the first virtual item list is received, the first virtual item list 403 and a status control 404 are displayed in virtual scene 400. Moreover, a prompt text "Discard" 405 is also displayed near the first virtual item list 403 to prompt a user that the first virtual item list 403 is currently in a discard status. When a user's click operation on the status control 404 is received, the status of the first virtual item list 403 is switched from the discard status to a usage status, and a prompt text "Use" 406 is displayed near the first virtual item list 403 to prompt the user that the status of the first virtual item list 403 has been switched to the usage status. When the user clicks the status control 404 again, the status of the first virtual item list 403 may be switched back from the usage status to the discard status.

In other embodiments, the foregoing display of the first virtual item list in the virtual scene may alternatively be implemented in the following ways: performing one of the following processing: displaying the first virtual item list in the virtual scene for each type of virtual items owned by the first virtual object, where the first virtual item list includes one virtual item of each type; and displaying the first virtual item list in the virtual scene for a quantity of each type of virtual items owned by the first virtual object, where the first virtual item list includes the remaining quantity of each type of virtual items.

For example, the first virtual object is virtual object A controlled by user 1. It is assumed that virtual object A holds three different types of virtual items, respectively "bandage", "medical kit", and "energy drink", where the remaining quantity of "bandage" is the remaining quantity of "medical kit" is 1, and the remaining quantity of "energy drink" is 3. Then, 1 "bandage", 1 "medical kit", and 1 "energy drink" may be displayed in the first virtual item list. Alternatively, 10 "bandages", 1 "medical kit", and 3 "energy drinks" may be displayed in the first virtual item list. This embodiment of this application does not limit the display quantity of each type of virtual item.

In some embodiments, the foregoing display of the first virtual item list in the virtual scene may be implemented in the following way: displaying the first virtual item list formed by at least one type of virtual items owned by the first virtual object in order in the virtual scene, where the display order of the at least one type of virtual items may be an order of a remaining quantity of each type of virtual items from high to low. For example, the highest remaining quantity of virtual items may be displayed at a head of the first virtual item list, and the lowest remaining quantity of virtual items may be displayed at a tail of the first virtual item list, namely, the display position of the more remaining quantity of virtual items in the first virtual item list is more prominent, so as to facilitate user's choice and discard, for example, the user can discard his most virtual items to teammates for item exchange without scrolling down the first virtual item list.

In other embodiments, the display order of the at least one type of virtual items may alternatively be an order of a usage frequency of each type of virtual items from high to low. For example, the virtual item with the highest usage frequency may be displayed at the head of the first virtual item list, and the virtual item with the lowest usage frequency may be displayed at the tail of the first virtual item list, namely, the display position of the virtual item with the higher usage frequency in the first virtual item list is more prominent, so as to facilitate user's choice and discard, for example, the user can discard his commonly used virtual items to teammates without scrolling down the first virtual item list.

In some embodiments, the display order of the at least one type of virtual items may alternatively be an order of the difference between the last usage time of each type of virtual items and the current time from small to large. For example, the virtual item having the smallest difference between the last usage time and the current time may be displayed at the head of the first virtual item list, and the virtual item having the largest difference between the last usage time and the current time may be displayed at the tail of the first virtual item list, namely, the display position of the virtual item last used closer to the current time in the first virtual item list is more prominent, so as to facilitate user's choice and discard, for example, the user can discard the most recently used virtual item to a teammate without scrolling down the first virtual item list.

In some embodiments, the display order of the at least one type of virtual items may alternatively be an order of a usage probability of each type of virtual items from high to low. For example, the virtual item with the highest usage probability may be displayed at the head of the first virtual item list, and the virtual item with the lowest usage probability may be displayed at the tail of the first virtual item list, namely, the display position of the virtual item with the higher usage probability in the first virtual item list is more prominent, so as to facilitate user's choice and discard, for example, the user can discard the virtual item with the highest usage probability to a teammate without scrolling down the first virtual item list.

For example, the first virtual object is virtual object A controlled by user 1. It is assumed that virtual object A holds three different types of virtual items, respectively "bandage", "medical kit", and "energy drink", where the remaining quantity of "bandage" is the remaining quantity of "medical kit" is 1, and the remaining quantity of "energy drink" is 3. Then, the display order of the three types of virtual items in the first virtual item list is: "bandage", "energy drink", and "medical kit".

For example, the first virtual object is virtual object A controlled by user 1. It is assumed that virtual object A holds three different types of virtual items, respectively "bandage", "medical kit", and "energy drink", and user 1 controlled virtual object A to use "bandage" 20 times, "medical kit" 5 times, and "energy drink" 3 times in the past week. Then, the display order of the three types of virtual items in the first virtual item list is: "bandage", "medical kit", and "energy drink".

For example, the first virtual object is virtual object A controlled by user 1. It is assumed that virtual object A holds three different types of virtual items, respectively "bandage", "medical kit", and "energy drink", and user 1 controlled virtual object A to use "medical kit" in the past 1 minute, controlled virtual object A to use "energy drink" in the past 5 minutes, and controlled virtual object A to use "bandage" in the past 10 minutes. Then, the display order of the three types of virtual items in the first virtual item list is: "medical kit", "energy drink", and "bandage".

For example, the first virtual object is virtual object A controlled by user 1. It is assumed that virtual object A holds three different types of virtual items, respectively "bandage", "medical kit", and "energy drink", and it is determined that the usage probability of "bandage" is 80%, the usage probability of "medical kit" is 90%, and the usage probability of "energy drink" is 70%. Then, the display order of the three types of virtual items in the first virtual item list is: "medical kit", "bandage", and "energy drink".

In other embodiments, following the previous text, the usage probability of each type of virtual items may be determined in the following way: performing feature extraction on environmental information of the virtual scene (such as a map type and a map size of the virtual scene), status parameters of the first virtual object (such as a health value, a stamina value, an ammunition quantity, and a drug quantity), attribute information of objects included in a first camp to which the first virtual object belongs (such as a quantity and position distribution of objects), attribute information of objects included in a second camp, and respective functions of each type of virtual items, and calling a machine learning model based on the extracted feature information for predictive processing to obtain the usage probability of each type of virtual items, where the first camp to which the first virtual object belongs and the second camp are hostile camps; the machine learning model is obtained by training environmental information of a sample virtual scene extracted from historical operation data of an expert account, status parameters of a sample virtual object controlled by the expert account, attribute information of other objects included in a camp to which the sample virtual object belongs, attribute information of objects included in a hostile camp against the camp to which the sample virtual object belongs, and labeled data; the level of the expert account is greater than a level threshold; and the labeled data includes types of virtual items used by the sample virtual object that is controlled by the expert account in an interaction process.

For example, the terminal device (or server) may call an initialized machine learning model for predictive processing, based on the environmental information of the sample virtual scene extracted from the historical operation data of the expert account, the status parameters of the sample virtual object controlled by the expert account, the attribute information of other objects included in the camp to which the sample virtual object belongs, and the attribute information of objects included in the hostile camp against the camp to which the sample virtual object belongs, to obtain the usage probability of each type of virtual item. Then the usage probability and the labeled data are substituted into a loss function for back-propagation processing to update parameters of the machine learning model, so as to obtain a trained machine learning model.

An exemplary structure of the machine learning model may include: an input layer (namely, an embedding layer), a coding layer (for example, including a plurality of cascaded convolutional layers), a fully-connected layer, and an output layer (including an activation function, such as a Softmax function). For example, after feature information is extracted, the feature information may be first input into the input layer for embedding, then embedded feature vectors output by the input layer are coded through the coding layer to obtain hidden layer feature vectors, the hidden layer feature vectors are fully connected through the fully-connected layer, finally fully-connected results output by the fully-connected layer are input into the output layer, and the output layer performs activation to obtain the usage probability of each type of virtual item.

The following describes the loss function used in the process of training the machine learning model.

This embodiment of this application may use various types of loss functions to train the machine learning model, such as a regression loss function, a binary loss function, a Hinge loss function, a multi-class loss function, and a multi-class cross entropy loss function.

For example, multi-class cross entropy loss is an extension of binary cross entropy loss. Loss between an input vector $X_i$ and a corresponding one-hot coding target vector $Y_i$ is:

$$L(X_i, Y_i) = \Sigma_{j=1}{}^{c}\gamma_{ij}*\log(p_{ij}) \qquad (1)$$

where $p_{ij}$ is an embedding representation of a one-hot coding vector of the foregoing feature information related to the $i^{th}$ type of virtual item (such as "medical kit"), c represents a total quantity of virtual items, and $\gamma_{ij}$ represents a usage probability, predicted based on the machine learning model, of the $i^{th}$ type of virtual item, such as a usage probability of "medical kit".

For example, Hinge loss is mainly used for a support vector machine with class labels (such as 1 and 0, where 1 represents victory and 0 represents failure). For example, a computation formula for the Hinge loss of a data pair (x, y) is as follows:

$$L = \max(0, 1 - \gamma * f(x)) \qquad (2)$$

where y represents a type of virtual item used by the sample virtual object that is controlled by the expert account in an interaction process (namely, a real value), and f(x) represents a usage probability, predicted based on the machine learning model, of each type of virtual item (namely, a predicted value). The Hinge loss simplifies mathematical operations of the support vector machine and maximizes a loss.

The foregoing machine learning model may be a neural network model (such as a convolutional neural network, a deep convolutional neural network, or a fully-connected neural network), a decision tree model, a gradient boosted tree, a multi-layer perceptron, a support vector machine, or the like. This embodiment of this application does not limit the type of the machine learning model.

In some embodiments, refer to FIG. 5A. FIG. 5A is a schematic flowchart of a virtual item processing method according to an embodiment of this application. As shown in FIG. 5A, when the first virtual item list is displayed in the virtual scene, step 104A shown in FIG. 5A may alternatively be performed. This will be explained in conjunction with step 104 shown in FIG. 5A.

In step 104A, update a display mode of a type of virtual items required by a second virtual object in the first virtual item list in response to appearance of the second virtual object in the virtual scene.

Here, the updated display mode is prominent to display modes of other types of virtual items in the first virtual item list (for example, the type of virtual items required by the second virtual object may be highlighted, while other types of virtual items are still displayed in a default display mode for differentiation), and the second virtual object is an object that needs item support from the first virtual object, or an object that needs item exchange with the first virtual object in the virtual scene.

In some embodiments, when the second virtual object is an object that needs item support from the first virtual object in the virtual scene, the type of virtual items required by the second virtual object in the first virtual item list may be determined in the following way: determining, based on status parameters of the second virtual object, the type of virtual items required by the second virtual object in the first virtual item list. For example, assuming that the current health value of the second virtual object is lower than a health threshold, the virtual item used for restoring the health value in the first virtual item list (such as "bandage"

or "medical kit") may be determined as the type of virtual items required by the second virtual object.

In other embodiments, when the second virtual object is an object that needs item exchange with the first virtual object in the virtual scene, the type of virtual items required by the second virtual object in the first virtual item list may be determined in the following way: determining a type of virtual item that the second virtual object holds less than a quantity threshold as the type of virtual items required by the second virtual object. For example, assuming that the quantity of "energy drink" that the second virtual object holds is less than a quantity threshold, "energy drink" may be used as the type of virtual items required by the second virtual object.

In other embodiments, before the display mode of the type of virtual items required by the second virtual object in the first virtual item list, the following processing may alternatively be performed: determining an object in the virtual scene that has a distance less than a distance threshold (for example, 5 meters) from the first virtual object, has a status parameter lower than a parameter threshold (for example, a health value lower than 50 points), and belongs to the same camp as the first virtual object, as the object that needs item support from the first virtual object; and determining virtual items of a remaining quantity less than a quantity threshold (for example, an average remaining quantity of a plurality of objects included in the first camp to which the first virtual object belongs, or a median remaining quantity) among the at least one type of virtual items owned by the first virtual object, and determining an object in the virtual scene that holds the virtual items of a quantity greater than the quantity threshold and belongs to the same camp as the first virtual object, as the object that needs item exchange with the first virtual object.

For example, the first virtual object is virtual object A controlled by user 1. It is assumed that virtual object A currently holds three different types of virtual items, respectively "bandage", "medical kit", and "energy drink", where the remaining quantity of "bandage" is 10, the remaining quantity of "medical kit" is 1 (less than an average remaining quantity 3), and the remaining quantity of "energy drink" is 3. Then, an object in the virtual scene that holds more than 3 "medical kit" (such as virtual object B in the same camp as virtual object A) may be determined as the object that needs item exchange with virtual object A.

Figure 4B:
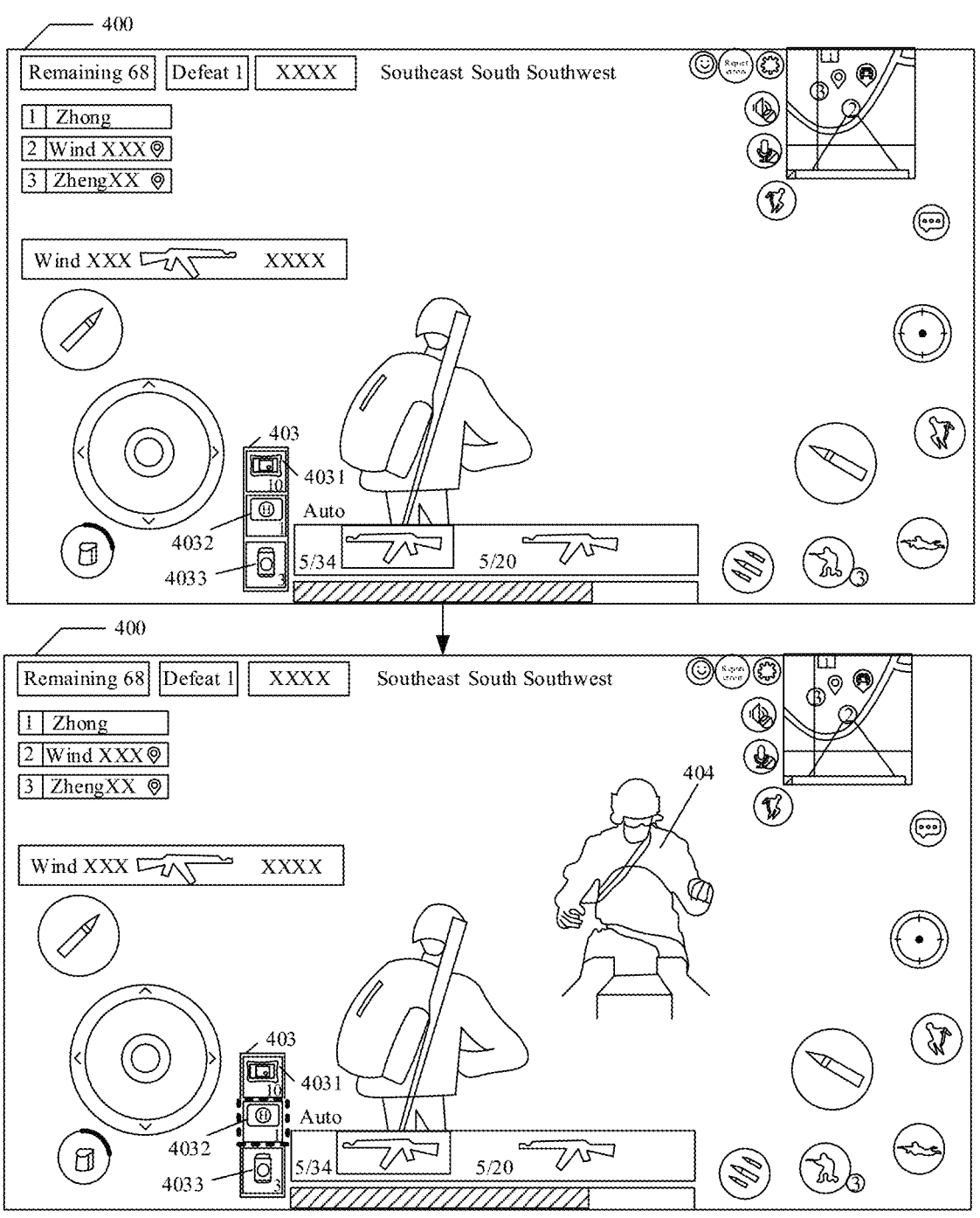

For example, refer to FIG. 4B. FIG. 4B is a schematic diagram of an application scene of a virtual item processing method according to an embodiment of this application. As shown in FIG. 4B, multiple different types of virtual items, such as "bandage" 4031, "medical kit" 4032, and "energy drink" 4033, are displayed in the first virtual item list 403. Next, in response to the appearance of the second virtual object 404 in the virtual scene 400, the display mode of the type of virtual items required by the second virtual object 404 in the first virtual item list 403 is updated. For example, assuming that the type of virtual items required by the second virtual object 404 is "medical kit", the "medical kit" 4032 included in the first virtual item list 403 may be highlighted to prompt the user to discard the "medical kit" 4032 to the second virtual object 404 for use.

In some embodiments, refer to FIG. 5B. FIG. 5B is a schematic flowchart of a virtual item processing method according to an embodiment of this application. As shown in FIG. 5B, when the first virtual item list is displayed in the virtual scene, step 104B and step 105B shown in FIG. 5B may alternatively be performed. This will be explained in conjunction with the steps shown in FIG. 5B.

In step 104B, update a display mode of a recommended discard type of virtual items in the first virtual item list when the first virtual object currently cannot reach a required movement speed.

Here, the required movement speed may be a movement speed that the first virtual object needs to reach in some specific environments (such as mountains and jungles) in order to catch up with virtual objects in the hostile camp, or to evade the pursuit of virtual objects in the hostile camp. The updated display mode is prominent to the display modes of other types of virtual items in the first virtual item list, and the recommended discard type is a type of virtual items recommended to be discarded to reduce the load of the first virtual object, so that the first virtual object reaches the required movement speed.

In some embodiments, the movement speed of the first virtual object is negatively correlated with the load of the first virtual object, that is, the lighter load of the first virtual object indicates a faster movement speed of the first virtual object (but there is an upper limit of movement speed, and the movement speed of the first virtual object will not increase after reaching the upper limit of movement speed). Then, the recommended discard type of virtual items in the first virtual item list may be determined in the following way: determining the recommended discard type of virtual items in the first virtual item list based on a weight and remaining quantity of each type of virtual items owned by the first virtual object. For example, the type of virtual items with a remaining quantity greater than a quantity threshold may be determined as the recommended discard type, and the type of virtual items with a weight greater than a weight threshold may also be determined as the recommended discard type. The recommended discard type may alternatively be determined by comprehensively considering the weight and remaining quantity of each type of virtual items. For example, the type of virtual items with a weight greater than a weight threshold and a remaining quantity greater than a quantity threshold may be determined as the recommended discard type.

After the recommended discard type is determined, a quantity of the recommended discard type of virtual items that need to be discarded when the first virtual object reaches the required movement speed may be further determined according to a functional relationship between the load and movement speed of the first virtual object, and the quantity is displayed in the first virtual item list, so as to facilitate user's choice and discard and improve operation efficiency.

In step 105B, display second prompt information when a virtual weight of virtual items that the first virtual object is controlled to discard can enable the first virtual object to reach the required movement speed.

Here, the second prompt information is used for prompting that the current movement speed of the first virtual object has reached the required movement speed, and that there is no need to discard virtual items.

For example, the first virtual object is virtual object A controlled by user 1. When the virtual weight of virtual items that the first virtual object is controlled to discard (for example, the foregoing recommended discard type of virtual items, or other types of virtual items) can enable the first virtual object to reach the required movement speed, the second prompt information may be displayed in the virtual scene, for example, "The current movement speed of virtual object A has reached the required movement speed, and there is no need to continue discarding virtual items".

Figure 4C:
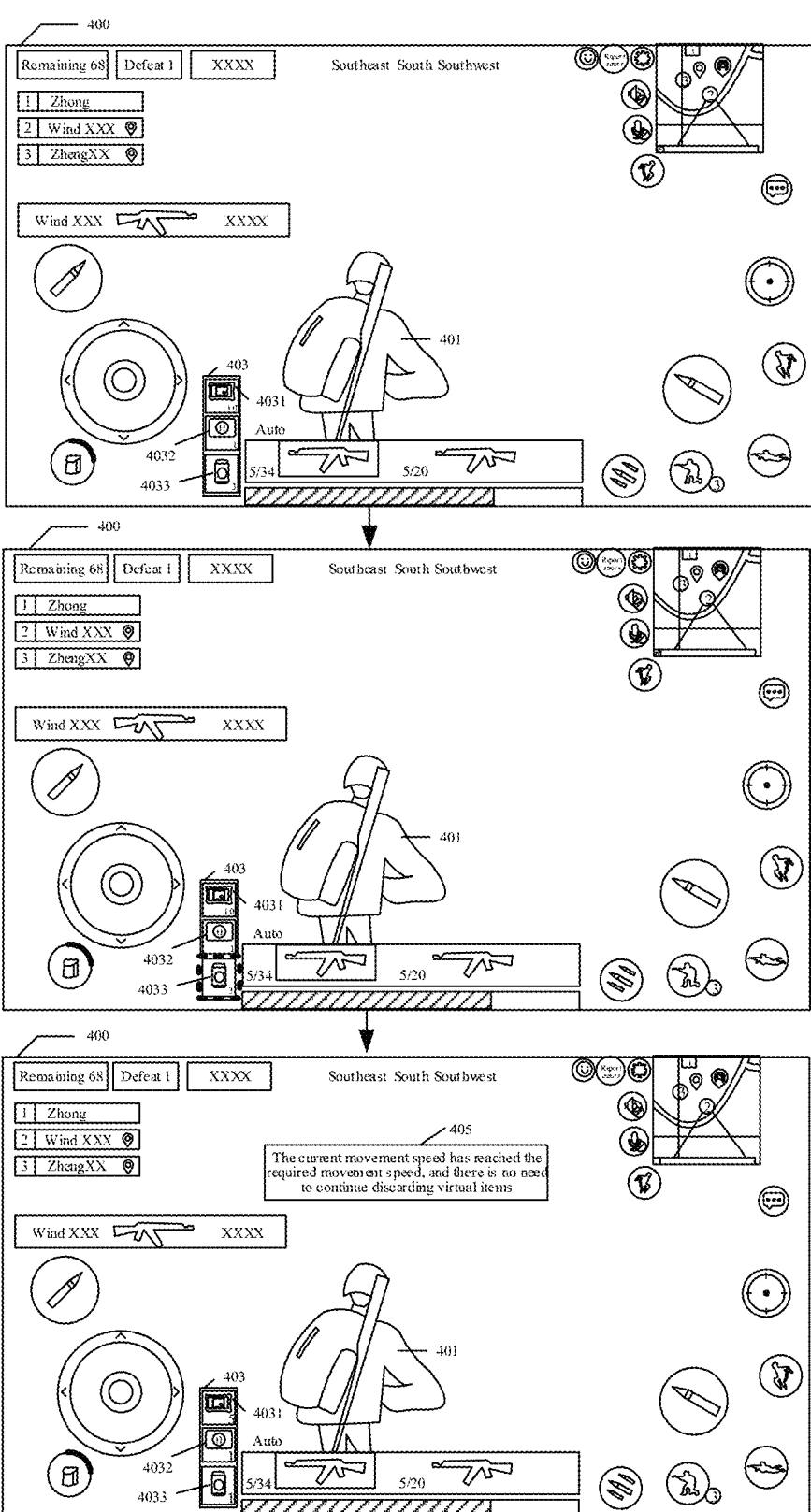

For example, refer to FIG. 4C. FIG. 4C is a schematic diagram of an application scene of a virtual item processing method according to an embodiment of this application. As shown in FIG. 4C, the first virtual object 401 and the first virtual item list 403 are displayed in the virtual scene 400, and multiple different types of virtual items, such as "bandage" 4031, "medical kit" 4032, and "energy drink" 4033, are displayed in the first virtual item list 403. Next, when the first virtual object 401 currently cannot reach the required movement speed, the display mode of the recommended discard type of virtual items in the first virtual item list 403 is updated (for example, assuming that the determined recommended discard type of virtual items is "energy drink", the "energy drink" 4033 is highlighted to distinguish from the display modes of other types of virtual items). Subsequently, when the virtual weight of virtual items that the first virtual object 401 is controlled to discard (for example, assuming that the user controls the first virtual object 401 to discard 5 "bandages" and 2 "energy drinks", the remaining quantity of "bandage" 4031 in the first virtual item list 403 decreases from 10 to 5, the remaining quantity of "energy drink" 4033 decreases from 3 to 1, and the highlighting of "energy drink" 4033 is canceled) can enable the first virtual object 401 to reach the required movement speed, the second prompt information 405 may be displayed in the virtual scene 400, for example, "The current movement speed has reached the required movement speed, and there is no need to continue discarding virtual items". Therefore, the display mode of the recommended discard type of virtual items is updated to facilitate user's choice and discard, and after the movement speed of the first virtual object reaches the required movement speed, corresponding prompt information is displayed in the virtual scene to prompt the user that there is no need to continue discarding virtual items, thereby improving human-computer interaction efficiency.

In some embodiments, for the first virtual item list in the discard status, when any operation (such as a click operation, a drag operation, or a slide operation) triggered by the user is not received within waiting duration (such as 30 seconds), the first virtual item list may be automatically folded and automatically switched from the discard status to the usage status. Alternatively, when a user's trigger operation on a fold button is received, the first virtual item list in the discard status may be folded, and the status of the first virtual item list may be automatically switched from the discard status to the usage status. This can avoid mistaken exit of the user in thinking. In addition, for the first virtual item list in the usage status, when any operation triggered by the user is not received within waiting duration, the first virtual item list may be automatically folded and kept still in the usage status.

In step 103, control the first virtual object to discard at least one virtual item of any type in response to a first selection operation on the any type of virtual items in the first virtual item list.

In some embodiments, when the first virtual item list has multiple different statuses (such as a discard status and a usage status), and the current status is a usage status, the following processing may also be performed before step 103 is performed: switching the status control to a display mode corresponding to the discard status in response to a trigger operation on the status control, to represent that the status of the first virtual item list has been switched from the usage status to the discard status, and performing the processing of controlling the first virtual object to discard at least one virtual item of any type in response to a first selection operation on the any type of virtual items in the first virtual item list.

A default status of the first virtual item list may be any of the following: the discard status, the usage status, a status when the first virtual item list was folded last time (for example, assuming that the status when the first virtual item list was folded last time was the discard status, when the first virtual item list is unfolded again, the default status of the first virtual item list is the discard status), a status with a highest usage frequency in the discard status and the usage status (for example, assuming that the discard status has been used 10 times and the usage status has been used 5 times in a historical period, when the first virtual item list is unfolded, the default status of the first virtual item list is the discard status), and a status with longest usage duration in the discard status and the usage status (for example, assuming that the usage duration of the discard status is 20 minutes and the usage duration of the usage status is 30 minutes in the historical time period, when the first virtual item list is unfolded, the default status of the first virtual item list is the usage status).

In some embodiments, types of the first selection operation may include: a click operation and a drag operation, and step 103 above may be implemented in the following way: controlling the first virtual object to discard a preset quantity of virtual items of any type in response to the click operation on the any type of virtual items in the first virtual item list (namely, in response to a single click operation, when receiving user's multiple click operations on any type of virtual items, controlling the first virtual object to discard a preset quantity of virtual items of any type multiple times); and controlling the first virtual object to discard all quantities of virtual items of any type in response to the drag operation of dragging the any type of virtual items in the first virtual item list to a ground region (namely, a discard response region) in the virtual scene.

For the drag operation, assuming that any type of virtual items does not fall into the ground region in the virtual scene when the user releases (that is, the user does not accurately drag any type of virtual items to the discard response region in the virtual scene), the first virtual object will not be controlled to discard all quantities of virtual items of the any type (that is, no virtual items are discarded). In this case, prompt information may alternatively be displayed in the virtual scene, for example, the ground region of the virtual scene is highlighted to prompt a position where the user needs to drag the virtual items to discard.

In other embodiments, following the previous text, for each click operation, a preset quantity of virtual items of any type discarded by the first virtual object may be determined in one of the following ways: determining a set quantity as the preset quantity of virtual items of any type discarded by the first virtual object in response to a quantity setting operation; and obtaining a remaining quantity of virtual items of any type in the first virtual item list, and determining a product of the remaining quantity and a discard coefficient as the preset quantity of virtual items of any type discarded by the first virtual object.

For example, after the first virtual object is controlled to discard any type of virtual items, a quantity setting interface may be displayed in the virtual scene, and in response to a quantity setting operation triggered in the quantity setting interface (for example, a quantity set by the user is 2), the set quantity is determined as the preset quantity of virtual items of any type discarded by the first virtual object (that is, each time the user clicks any type of virtual items in the first virtual item list, the first virtual object is controlled to discard 2 virtual items of the type). Alternatively, a current remaining quantity of virtual items of any type in the first virtual item list may be obtained, and a product of the current remaining quantity and a discard coefficient is determined as the preset quantity of virtual items of any type discarded by the first virtual object. For example, "bandage" is used as an example. Assuming that the quantity of "bandage" currently owned by the first virtual object is 100 and the discard coefficient is 0.2, when a user's click operation on the "bandage" displayed in the first virtual item list is received, the first virtual object is controlled to discard 20 (100*0.2) "bandages". At this time, the quantity of "bandage" owned by the first virtual object decreases to 80. Then, when a user's click operation on the "bandage" displayed in the first virtual item list is received again, the first virtual object is controlled to discard 16 (80*0.2) "bandages". In this case, the quantity discarded each time is positively correlated with a total quantity of virtual items, thereby improving discard efficiency when the quantity of virtual items is large.

In some embodiments, after step S103 is performed, at least one of the following processing may be further performed: updating the remaining quantity of virtual items of any type in the first virtual item list to a remaining quantity after a discarded quantity is subtracted (taking "bandage" as an example, assuming that the remaining quantity of "bandage" is 10 before discard and assuming that the discarded quantity of "bandage" is 2, the remaining quantity of "bandage" may be updated from 10 to 8); displaying the any type of virtual items in the ground region of the virtual scene; displaying first prompt information in the virtual scene, where the first prompt information is used for prompting that any type of discarded virtual items is not to be automatically picked up; and displaying a pick list in the virtual scene (for example, a nearby region of the discarded virtual items), and displaying the any type of discarded virtual items in the pick list (for example, displaying one discarded virtual item of each type, or displaying a discarded quantity of virtual items of each type).

The remaining quantity of virtual items of any type in the first virtual item list may be updated once per user click, or updated only when the user stops clicking after multiple consecutive clicks, which is not limited in this embodiment of this application.

In other embodiments, the following processing may alternatively be performed for any type of virtual items in the first virtual item list: when the remaining quantity of virtual items of the any type is not zero, applying a color mode to the any type of virtual items (namely, displaying virtual items in color); and when the remaining quantity of virtual items of the any type decreases to zero, applying a gray mode to the any type of virtual items (that is, displaying the virtual items in gray, and setting the virtual items in a non-interactive status, that is, giving no response when the user clicks or drags the virtual items), where the gray mode represents that the any type of virtual items has been completely discarded and cannot be further discarded.

Different display sizes or different transparencies may alternatively be used to distinguish the cases that the remaining quantity of virtual items is not zero or zero, which is not limited in this embodiment of this application.

In some embodiments, the discard and usage of any type of virtual items in the first virtual item list may be implemented in different operation manners, that is, the first selection operation may be an operation of selecting any type of virtual items for discard, and an operation mode of the first selection operation includes: a slide operation in a first direction (for example, slide to the left), or a first click operation on the any type of virtual items. The following processing may be further performed: controlling the first virtual object to use at least one virtual item of any type in response to a second selection operation on the any type of virtual items in the first virtual item list, where the second selection operation is an operation of selecting the any type of virtual items for use, and an operation mode of the second selection operation includes: a slide operation in a second direction different from the first direction (for example, slide to the left may be set as an operation mode of discarding items, and slide to the right may be set as an operation mode of using items; or slide to the left may be set as an operation mode of using items, and slide to the right may be set as an operation mode of discarding items), or a second click operation on any type of virtual items, where a click region or a number of clicks corresponding to the second click operation is different from that corresponding to the first click operation (For example, the click region corresponding to the first click operation may be set as an upper half of a virtual item, and the click region corresponding to the second click operation may be set as a lower half of the virtual item, that is, when the user clicks the upper half of any type of virtual items, the first virtual object is controlled to discard at least one virtual item of the any type; and when the user clicks the lower half of any type of virtual items, the first virtual object is controlled to use at least one virtual item of the any type. For example, the number of clicks corresponding to the first click operation may be set to 1, and the number of clicks corresponding to the second click operation may be set to 2, that is, when the user clicks any type of virtual items once, the first virtual object is controlled to discard at least one virtual item of the any type; and when the user clicks any type of virtual items twice, the first virtual object is controlled to use at least one virtual item of the any type). In this case, different operation modes are set to discard and use virtual items, thereby improving human-computer interaction efficiency.

In some embodiments, the first virtual item list may be a list dedicated to selecting and discarding any type of virtual items, and the following processing may alternatively be performed: displaying a second virtual item list in the virtual scene in response to a trigger operation on an entry to the second virtual item list, where the second virtual item list includes at least one type of virtual items owned by the first virtual object, and the second virtual item list is a list dedicated to selecting and using any type of virtual items; and controlling the first virtual object to use at least one virtual item of any type in response to a third trigger operation (for example, a click operation) on the any type of virtual items in the second virtual item list.

A type and quantity of virtual items included in the first virtual item list may be the same as or different from those of the second virtual item list, for example, the first virtual item list includes "bandage", "medical kit", and "energy drink", and the second virtual item list includes only "medical kit" and "energy drink". This is not limited in this embodiment of this embodiment.

Figure 4D:
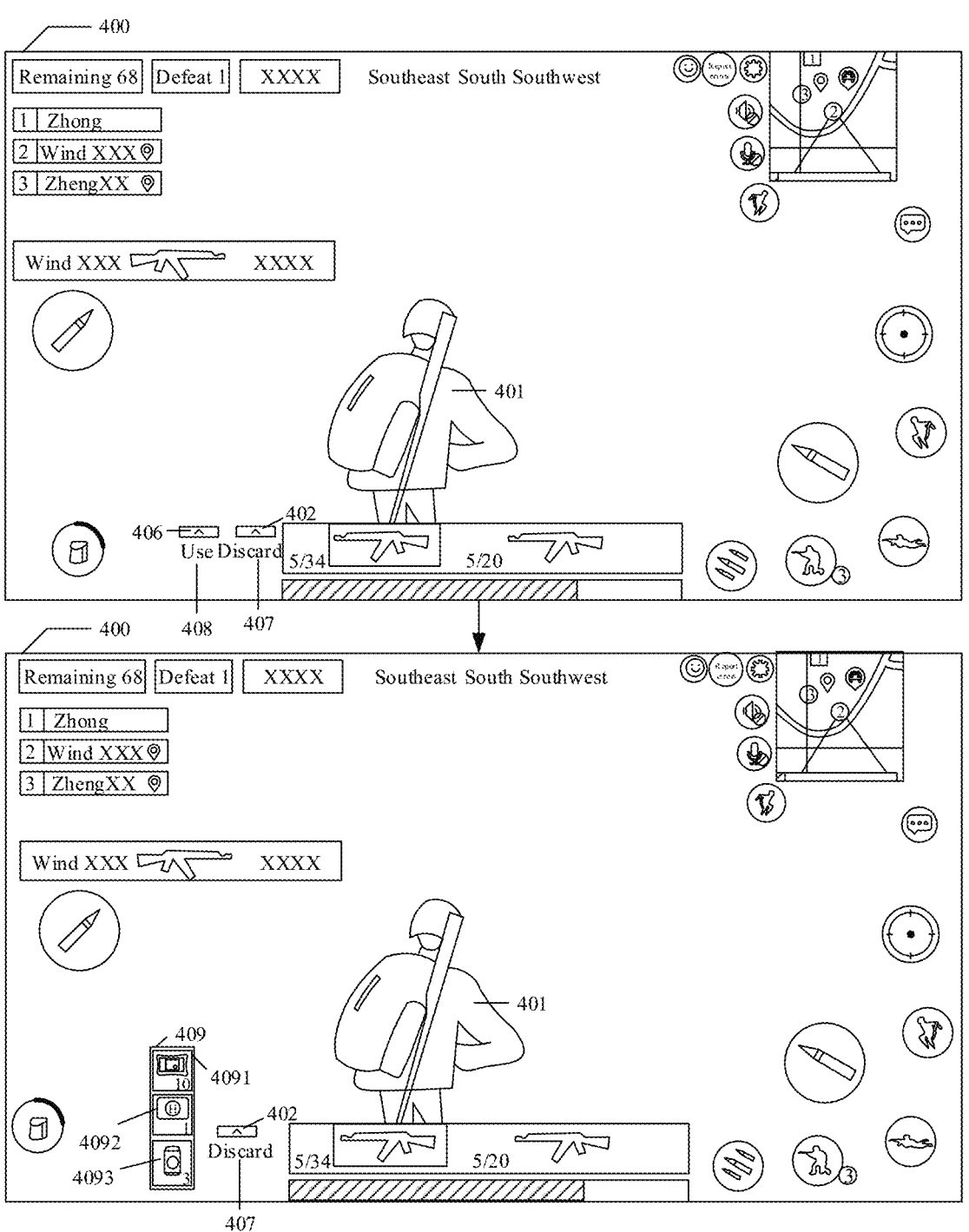

For example, refer to FIG. 4D. FIG. 4D is a schematic diagram of an application scene of a virtual item processing method according to an embodiment of this application. As shown in FIG. 4D, in the virtual scene 400, an entry 402 to the first virtual item list and an entry 406 to the second virtual item list are displayed, while a prompt text "Discard" 407 is displayed near the entry 402 to the first virtual item list to notify the user that the first virtual item list is a list dedicated to selecting and discarding any type of virtual items; and a prompt text "Use" 408 is displayed near the entry 406 to the second virtual item list to notify the user that the second virtual item list is a list dedicated to selecting and using any type of virtual items. When a user's trigger operation (such as a click operation) on the entry 406 to the second virtual item list is received, the second virtual item list 409 is displayed in the virtual scene 400. Multiple different types of virtual items are displayed in the second virtual item list 409, such as, "bandage" 4091, "medical kit" 4092, and "energy drink" 4093. When the user clicks the "medical kit" 4092 displayed in the second virtual item list 409, the first virtual object 401 is controlled to use the "medical kit", thereby increasing the health value of the first virtual object 401. Therefore, by setting two virtual item lists with different functions, the efficiency of using and discarding virtual items by the user is improved, and user's gaming experience is further improved.

In the virtual item processing method provided in this embodiment of this application, an entry to a first virtual item list is set in a virtual scene, the first virtual item list is displayed in the virtual scene upon receiving a trigger operation on the entry to the first virtual item list, and then a first virtual object is controlled to discard at least one virtual item of any type upon receiving a first selection operation on any type of virtual items in the first virtual item list. In this case, virtual items can be discarded only in the virtual scene, and operation steps when a user controls a virtual object to discard virtual items are simplified, thereby improving human-computer interaction efficiency.

Hereinafter, a shooting game is used as an example to illustrate an exemplary application of this embodiment of this application in a practical application scene.

In a first-person shooting (FPS) game, a related technology provides a discard mode of virtual items (such as medicines and missiles) as follows: clicking a backpack button to enter a backpack interface, selecting virtual items to be discarded in the backpack interface, and then selecting a discard quantity before discarding.

Figure 6A:
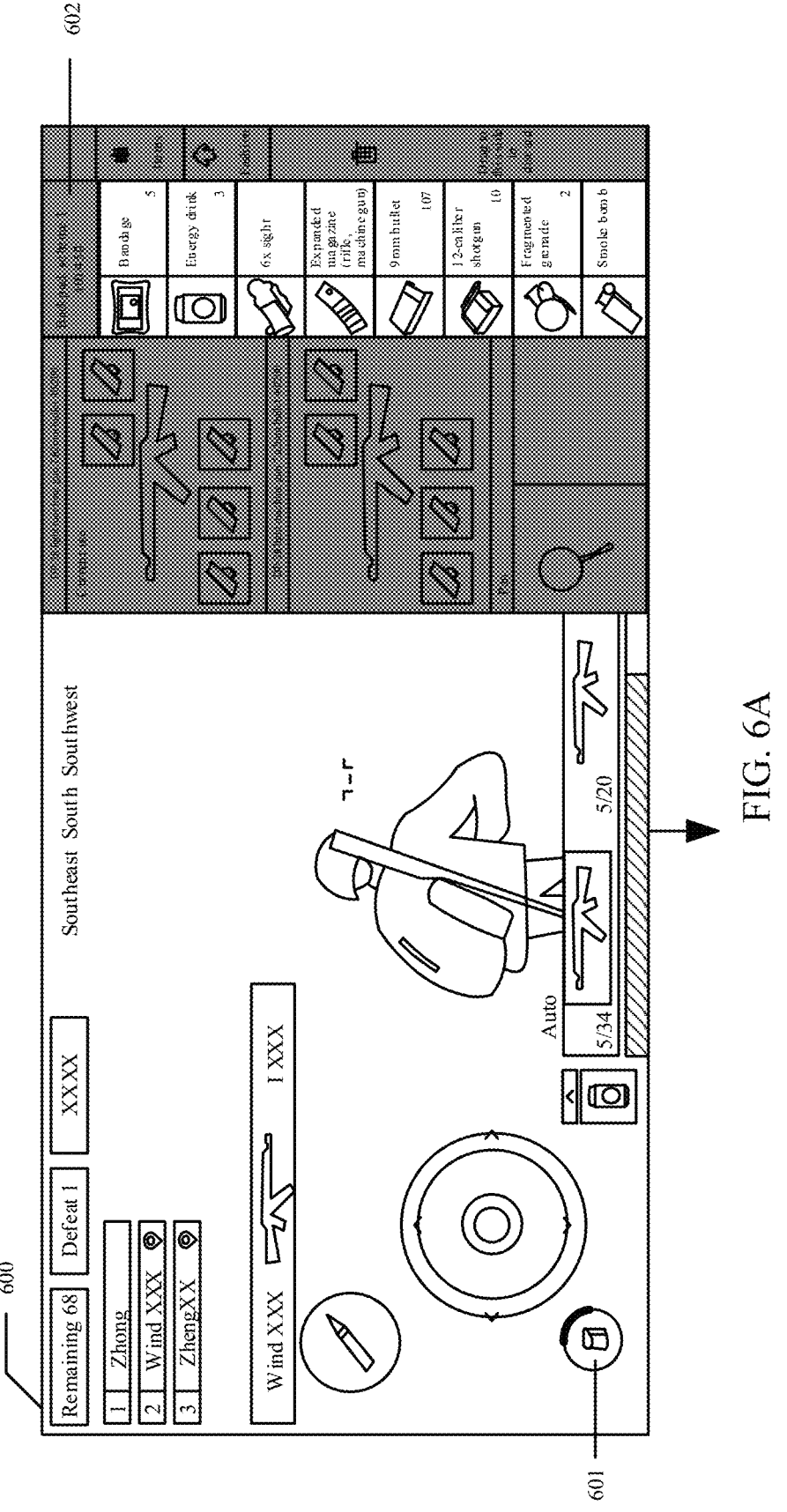
FIG. 6A and FIG. 6B are schematic diagrams of application scenes of a virtual item processing method according to related technologies.

For example, refer to FIG. 6A. FIG. 6A is a schematic diagram of an application scene of a virtual item processing method according to a related technology. As shown in FIG. 6A, a backpack button 601 is displayed in a fight interface 600. When a click operation on the backpack button 601 is received from a user (also known as a player), a backpack interface 602 is displayed. At this time, the user may slide a list displayed in the backpack interface 602 to find a virtual item to be discarded from a backpack. For example, assuming that the virtual item that the user needs to discard is "Stun grenade" 6021, the "Stun grenade" 6021 may be directly dragged to a sidebar 6022 to discard all quantities of the item.

Figure 6B:
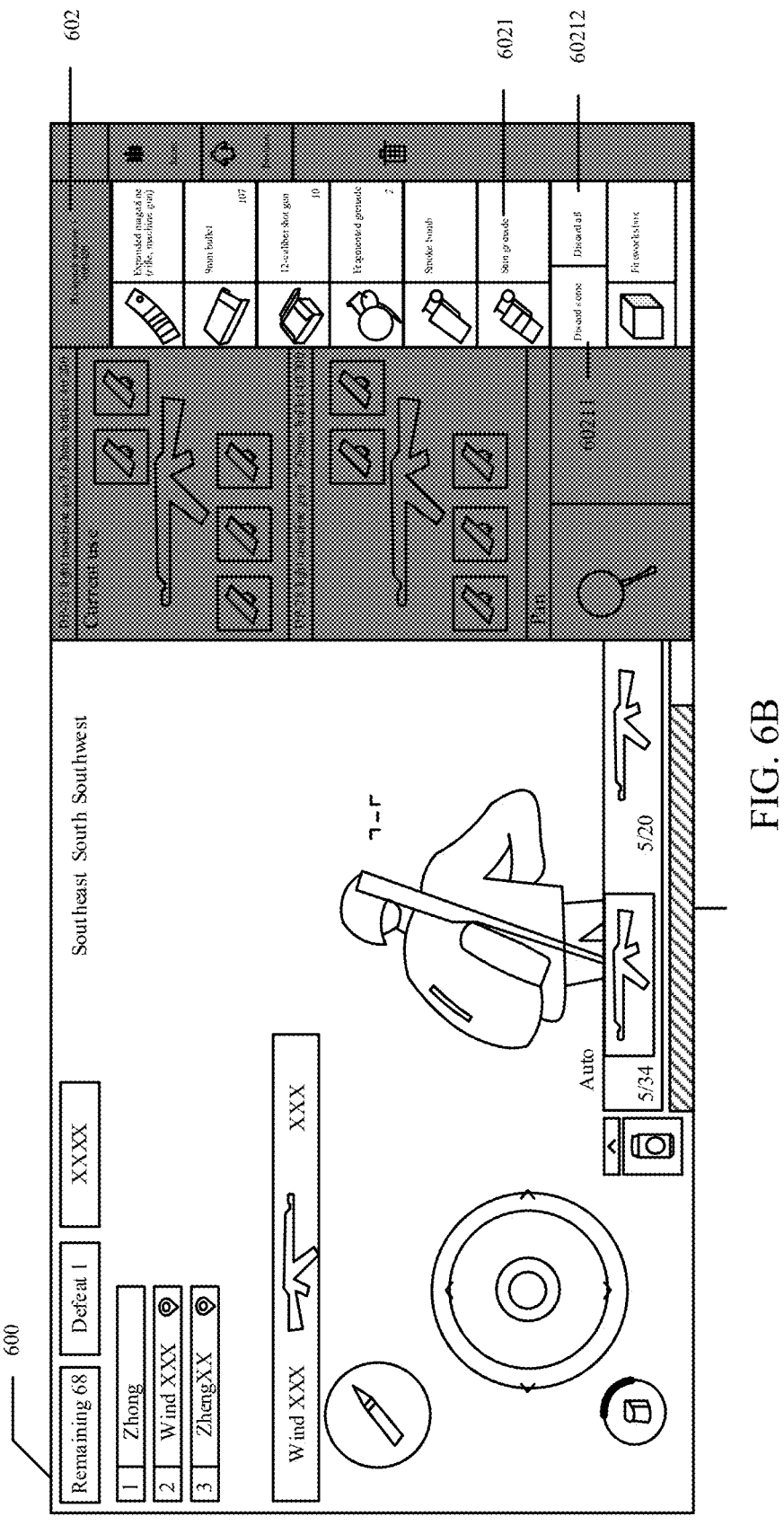

For example, refer to FIG. 6B. FIG. 6B is a schematic diagram of an application scene of a virtual item processing method according to a related technology. As shown in FIG. 6B, when a user desires to discard "Stun grenade" in a backpack, the user may click the "Stun grenade" 6021 displayed in the backpack interface 602. At this time, a "Discard some" button 60211 and a "Discard all" button 60212 are displayed. When the user clicks the "Discard some" button 60211, a quantity selection pop-up window 60213 is displayed, and the user may drag a slider displayed in the quantity selection pop-up window 60213, or click a plus or minus button to select a discard quantity and then click the discard button displayed in the quantity selection pop-up window 60213, to discard a selected quantity of "Stun grenade" 6021. When the user clicks the "Discard all" button 60212, all quantities of "Stun grenade" 6021 are discarded. In addition, after the user controls the virtual object to discard the "Stun grenade" 6021, the virtual items (such as "Stun grenade" 6021) discarded by the user are displayed in a pick list 603 displayed on the fight interface 600. Meanwhile, prompt information 604 may alternatively be displayed, such as "Not automatically pick up the same type of discarded items within 30 seconds".

It may be seen that, in the solutions provided by the related technologies, the user needs to operate many steps when discarding virtual items, such as accurate operations of dragging, sliding a list, and the like; and when the user desires to control some virtual items to be discarded, at least 6 steps are performed, where in the list displayed in the backpack interface, when some virtual items are to be discarded, more click operations are required to select a discard quantity (or a discard quantity is selected by accurately dragging a slider). In addition, when the user discards a virtual item, because various types of virtual items displayed in the backpack interface are mixed together, the user first needs to find the position of the virtual item to be discarded in the list, thereby further reducing operation efficiency.

In view of this, an embodiment of this application provides a virtual item processing method, which may facilitate a user to quickly find and discard virtual items to be discarded in a first-level fight interface (also known as a main interface, corresponding to the foregoing virtual scene), thereby reducing operation steps, and further reducing time costs for the user to search virtual items (including drugs and missiles) in a backpack. In this way, in the process of interacting with other users (for example, controlling a virtual object to fight with virtual objects controlled by other users in a fight interface), drugs or grenades can be quickly thrown to teammates with residual blood (namely, virtual objects controlled by other users in the same camp), so as to reduce a probability that the virtual object controlled by the current user is hurt during fight due to operations of item exchange, backpack cleaning, and the like, and increase a possibility of fight victory.

Virtual items are drugs as an example below to describe the virtual item processing method provided in this embodiment of this application.

Figure 7A:
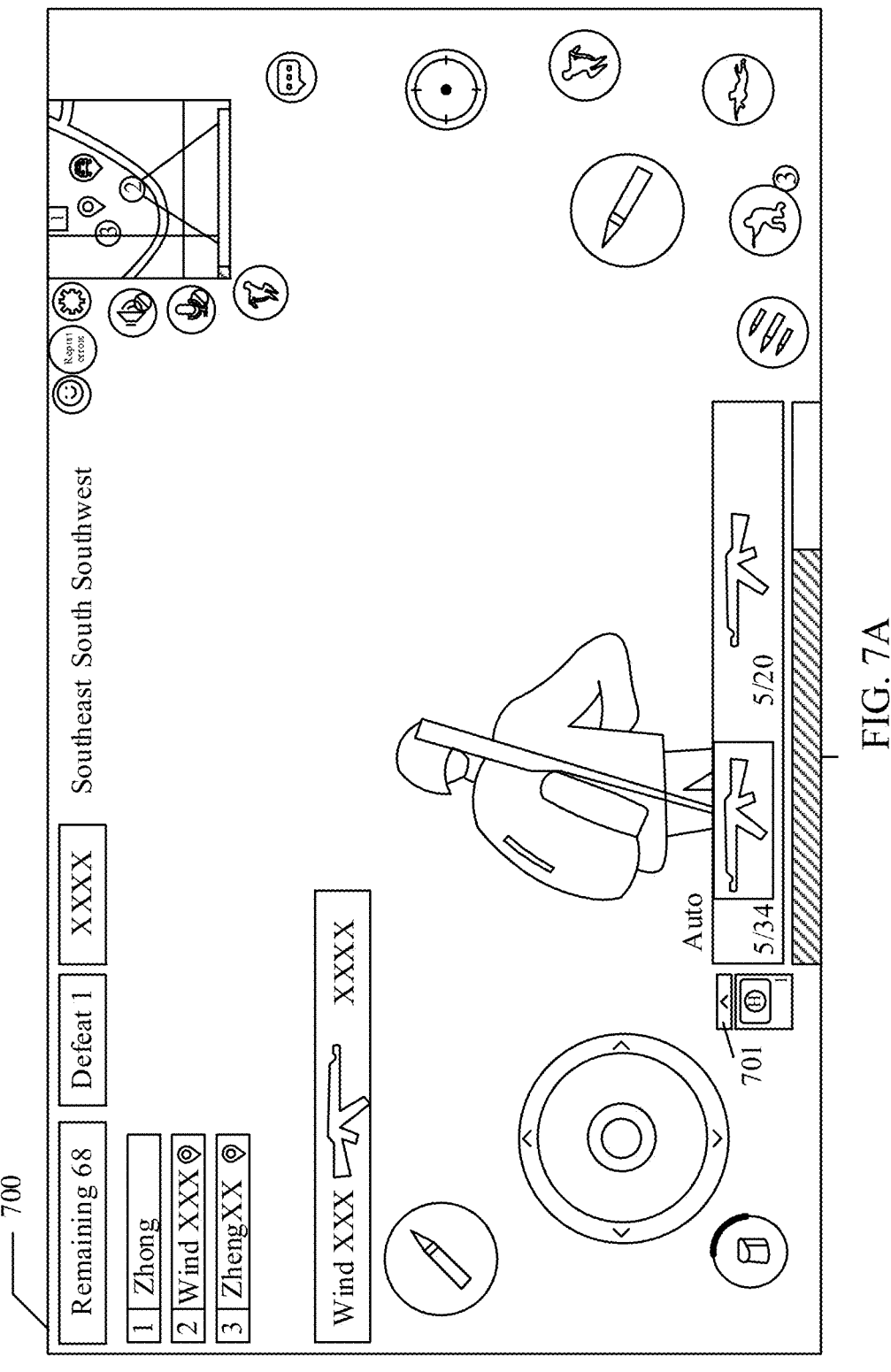
FIG. 7A to FIG. 7F are schematic diagrams of application scenes of a virtual item processing method according to an embodiment of this application.

For example, refer to FIG. 7A. FIG. 7A is a schematic diagram of an application scene of a virtual item processing method according to an embodiment of this application. As shown in FIG. 7A, an unfold button 701 is displayed in a first-level fight interface 700. When a virtual object controlled by a user holds only one type of drugs, and when a user's click operation on the unfold button 701 is received, the type of drugs owned by the virtual object (such as "medical kit") and a discard button 703 are displayed in a drug list 702, where the discard button 703 is used for controlling the drug list 702 to enter a discard status (in the discard status, clicking a drug in the drug list 702 as a discard drug) from a usage status (in the usage status, clicking a drug in the drug list 702 as a usage drug).

Figure 7B:
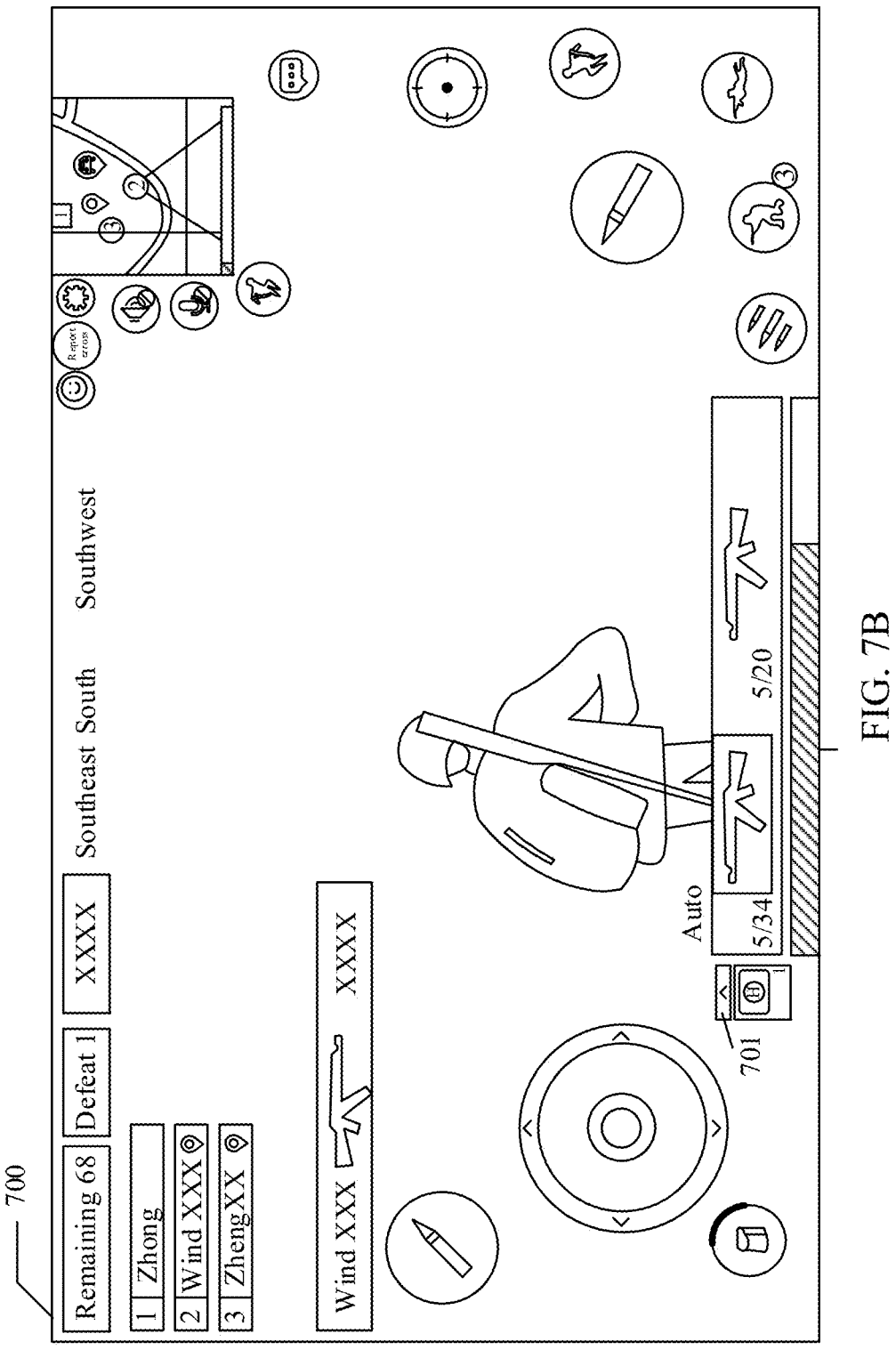

For example, refer to FIG. 7B. FIG. 7B is a schematic diagram of an application scene of a virtual item processing method according to an embodiment of this application. As shown in FIG. 7B, the unfold button 701 is displayed in the first-level fight interface 700. When the virtual object controlled by the user holds multiple different types of drugs, and when a user's click operation on the unfold button 701 is received, all the types of drugs owned by the virtual object (such as "bandage" and "medical kit") and the discard button 703 are displayed in the drug list 702, where the discard button 703 is used for controlling the drug list 702 to enter a discard status from a usage status.

The display mode of the drug list 702 may be in different shapes such as a disk, a sector, or a sudoku in addition to a rectangle, which is not limited in this embodiment of this application.

In some embodiments, when the drug list is in the discard status, a set quantity (such as 1 or more) of a type of drugs may be discarded by clicking the type of drugs in the drug list.

Figure 7C:
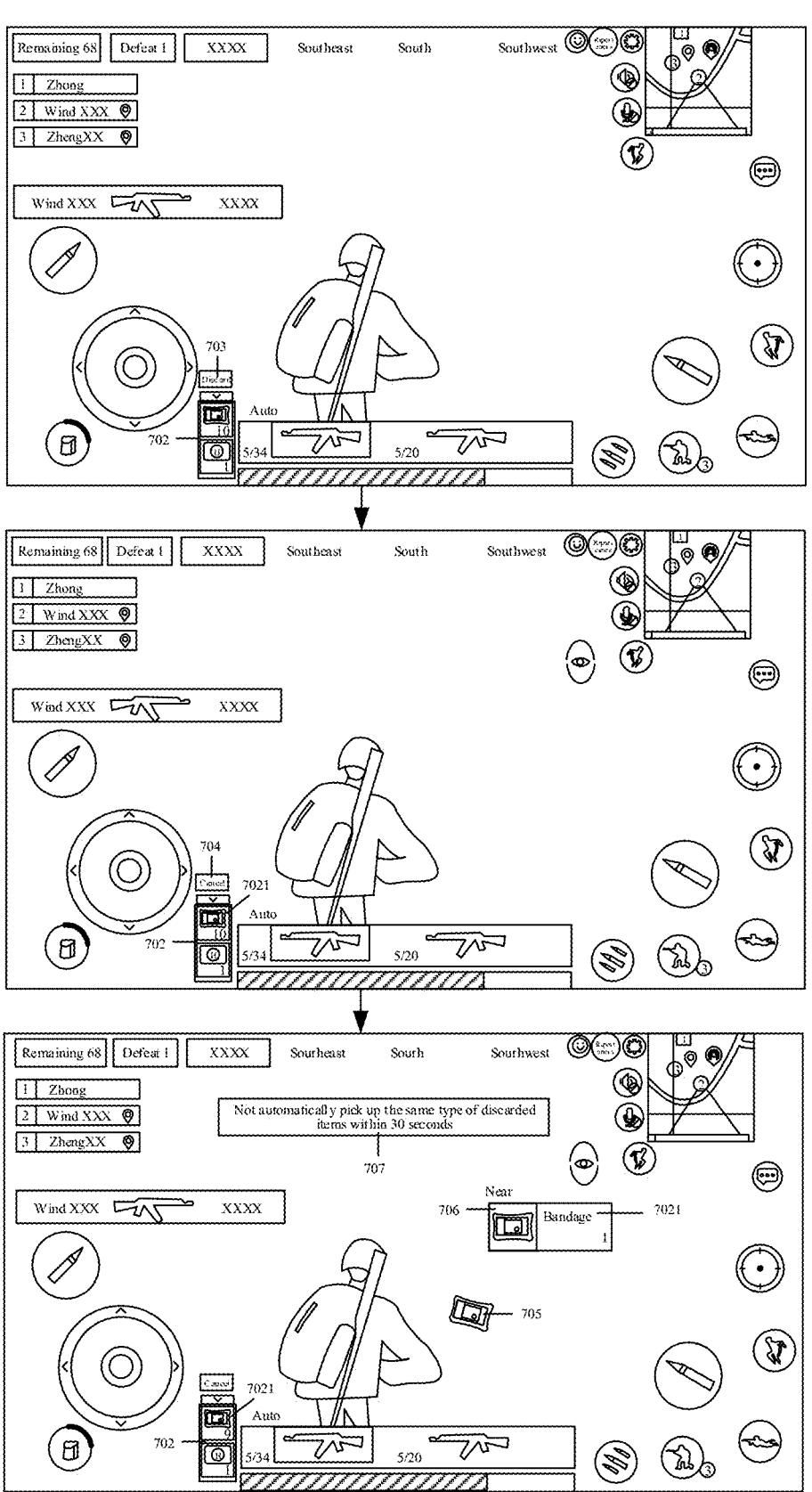

For example, refer to FIG. 7C. FIG. 7C is a schematic diagram of an application scene of a virtual item processing method according to an embodiment of this application. As shown in FIG. 7C, when a user's click operation on the discard button 703 is received, the drug list 702 is controlled to enter the discard status, and the discard button 703 is hidden and a cancel button 704 is displayed in the first-level fight interface, where the cancel button 704 is used for switching, when clicked, the status of the drug list 702 back from the discard status to the usage status (also known as a normal status). When the user clicks any type of drugs (such as "bandage" 7021) in the drug list 702 in the discard status, the virtual object is controlled to discard a preset quantity of (such as 1 or more) "bandage". For example, every time the user clicks "bandage" 7021, the virtual object controlled by the user discards a "bandage". In this case, the quantity of "bandage" 7021 displayed in the drug list 702 decreases by 1 (for example, decreases from 10 to 9), a discarded "bandage" model 705 appears on the ground of the fight interface, the "bandage" 7021 just discarded by the user and the quantity 1 are displayed in the pick list 706, and prompt information 707 may alternatively be displayed in the first-level fight interface, for example, the following content is prompted by floating characters: "Not automatically pick up the same type of discarded items within 30 seconds".

When the user continuously clicks a type of drugs (such as "bandage") in the drug list 702 in the discard status, the quantity of this type of drugs displayed in the drug list 702 decreases by 1 per click (for example, the quantity of "bandage" decreases from 10 to 9 on the first click, from 9 to 8 on the second click, and from 8 to 7 on the third click), and the quantity of this type of drugs displayed in the pick list increases by 1 each time (for example, the quantity of "bandage" increases from 0 to 1 on the first click, from 1 to 2 on the second click, and from 2 to 3 on the third click).

Figure 7D:
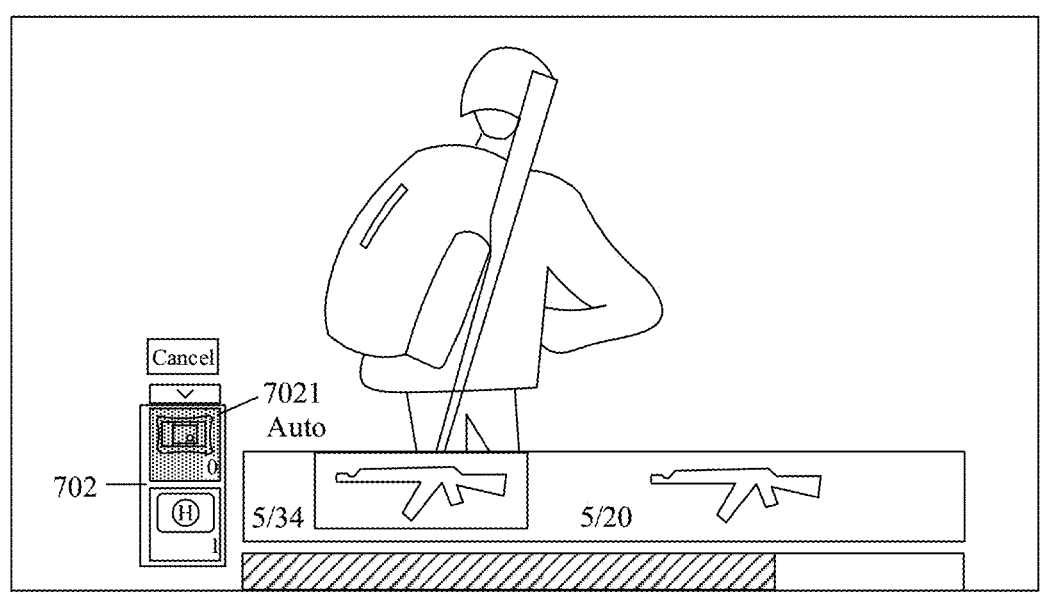

For example, refer to FIG. 7D. FIG. 7D is a schematic diagram of an application scene of a virtual item processing method according to an embodiment of this application. As shown in FIG. 7D, when a type of drugs (such as "bandage" 7021) in the drug list 702 in the discard status has been discarded to a quantity of 0, the quantity of this type of drugs is displayed as 0, and the status is grayed. In this case, when the drug is clicked or dragged, there is no feedback.

Unlike usage drugs, when a type of drugs is used up in the usage status, that is, when the quantity is 0, a corresponding icon disappears directly. In the discard status, when a type of drugs is discarded to a quantity of 0, the icon of the drug still exists. This can avoid mistaken touch to discard another drug due to the disappearance of the icon after the user quickly clicks to discard a drug.

In some embodiments, when the drug list is in the discard status, all quantities of a type of drugs may alternatively be discarded by dragging this type of drugs.

Figure 7E:
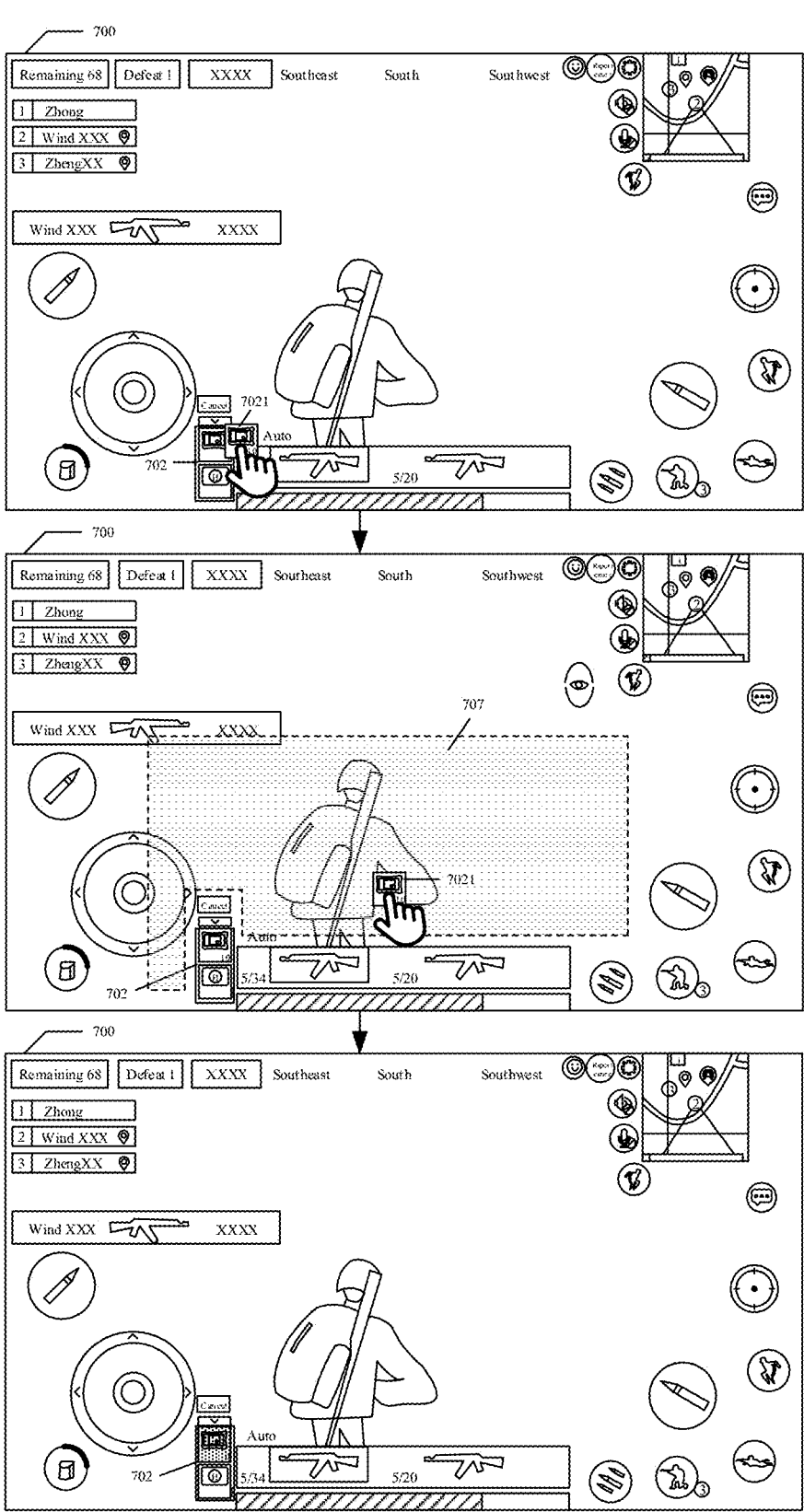

For example, refer to FIG. 7E. FIG. 7E is a schematic diagram of an application scene of a virtual item processing method according to an embodiment of this application. As shown in FIG. 7E, for the drug list 702 in the discard status, when the user desires to discard all quantities of a type of drugs (such as "bandage" 7021) in the drug list 702, the "bandage" 7021 may be dragged to a discard response region (such as a shadow region 707 shown in FIG. 7E) of the first-level fight interface 700, and all quantities of this type of drugs may be discarded after release. In addition, after the drugs are discarded by release, the quantity of this type of drugs in the drug list 702 decreases to 0, and the status is grayed. Meanwhile, a discarded drug model and prompt information may alternatively be displayed in the first-level fight interface 700, the following is prompted by floating characters: "Not automatically pick up the same type of discarded items within 30 seconds". In addition, information about just discarded drugs appears in the pick list, where the quantity of drugs is the total quantity of drugs discarded by the user.

Figure 7F:
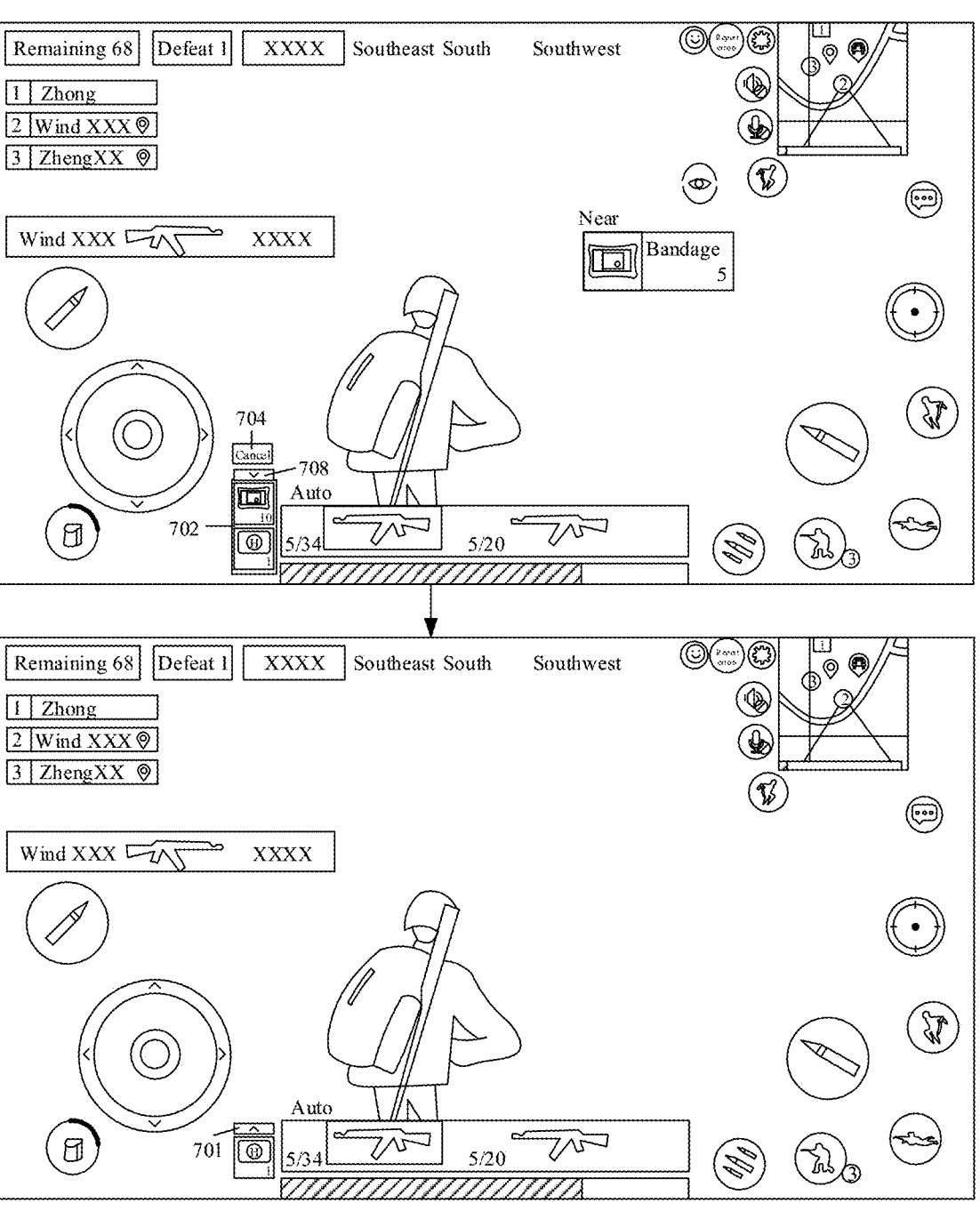

For example, refer to FIG. 7F. FIG. 7F is a schematic diagram of an application scene of a virtual item processing method according to an embodiment of this application. As shown in FIG. 7F, when the user clicks the cancel button 704, the drug list 702 is switched back from the discard status to the usage status. When the drug list 702 is in the usage status, and a click operation on a type of drugs in the drug list 702 is received, the virtual object is controlled to use this type of drugs. In addition, when the drug list 702 is in the discard status and a user's click operation on a fold button 708 is received, the drug list 702 is folded, and the drug list 702 is controlled to switch back from the discard status to the usage status. When the user opens the drug list 702 again through the unfold button 701, the drug list 702 is in the usage status, and the user needs to click the discard button, so that the drug list 702 reenters the discard status.

In related technologies, when the user does not operate (including clicking, dragging, or sliding an interactive control) the drug list or missile list, the drug list or missile list is automatically folded after set duration (for example, 3 seconds). In this embodiment of this application, for the drug list in the discard status, if the user does not operate within the set duration, the drug list is not automatically folded, thereby avoiding mistaken exit of the user in an operational thinking status and improving user's gaming experience.

Figure 8:
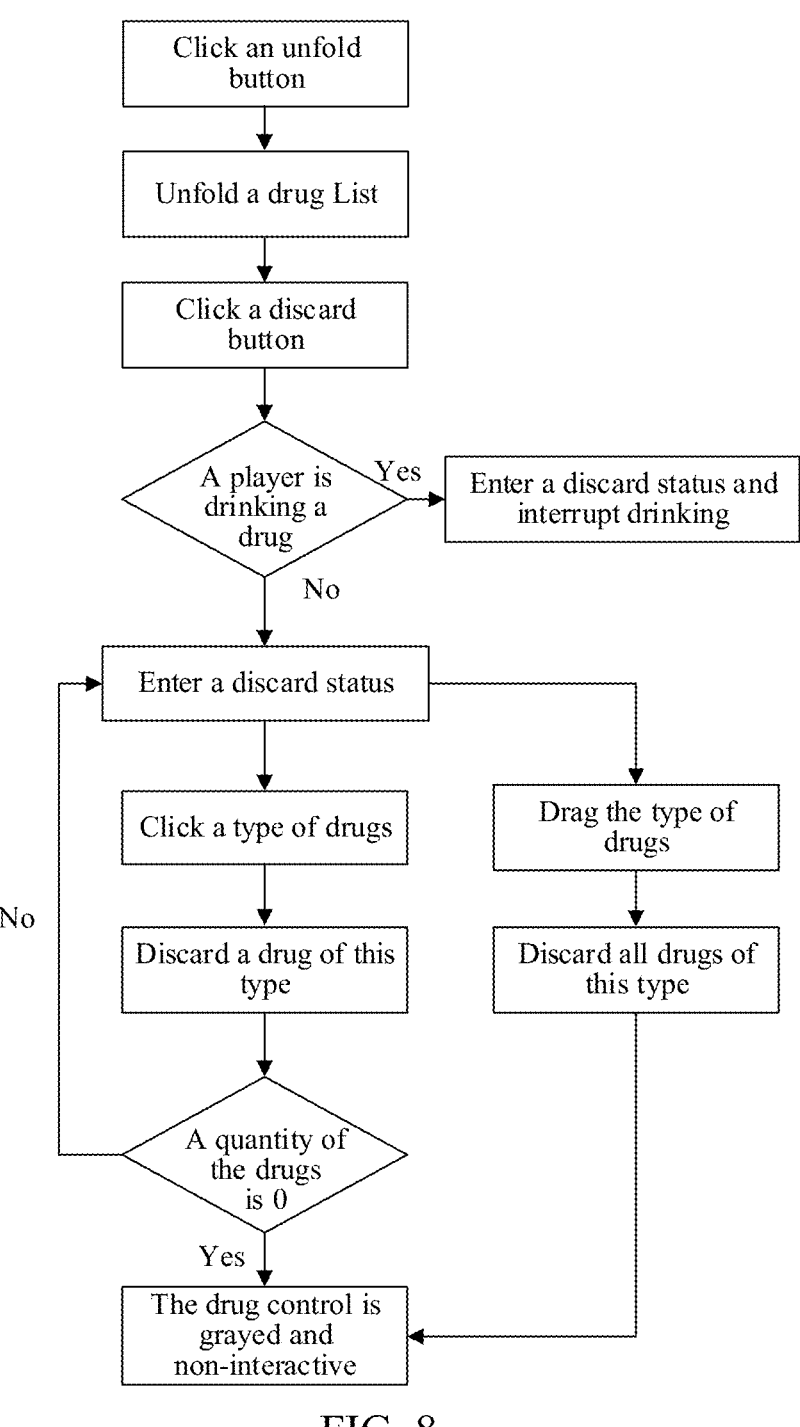
FIG. 8 is a schematic flowchart of a virtual item processing method according to an embodiment of this application.

For example, refer to FIG. 8. FIG. 8 is a flowchart of a virtual item processing method according to an embodiment of this application. As shown in FIG. 8, when a client receives a user's click operation on an unfold button displayed on a first-level fight interface, a drug list is unfolded. Next, after a user's click operation on a discard button is received, whether a player is currently drinking a drug (namely, whether a virtual object controlled by the player is currently using a drug) is determined. When the player is drinking the drug, the drug list is controlled to enter a discard status and the player's drinking action is interrupted. At this time, the blood of the virtual object controlled by the player is restored to the status before the drug is used. When the player is not drinking the drug, the drug list is controlled to enter the discard status. Subsequently, when a player's click operation on a type of drugs in the drug list in the discard status is received, the virtual object is controlled to discard one drug of this type (namely, each click operation of the player may be considered as discarding a drug to the ground, and the player may continue clicking until the quantity of this type of drugs decreases to 0). Alternatively, the player may discard all drugs of a type once by dragging this type of drugs (for example, when the player drags a type of drugs from the drug list in the discard status to a discard response region in the first-level fight interface, all drugs of this type may be discarded, and the remaining quantity of this type of drugs in the drug list directly decreases to 0). When the quantity of this type of drugs in the drug list is 0, a control for this type of drugs may be grayed to be in a non-interactive status.

A process of determining a drag operation will be described below.

Figure 9:
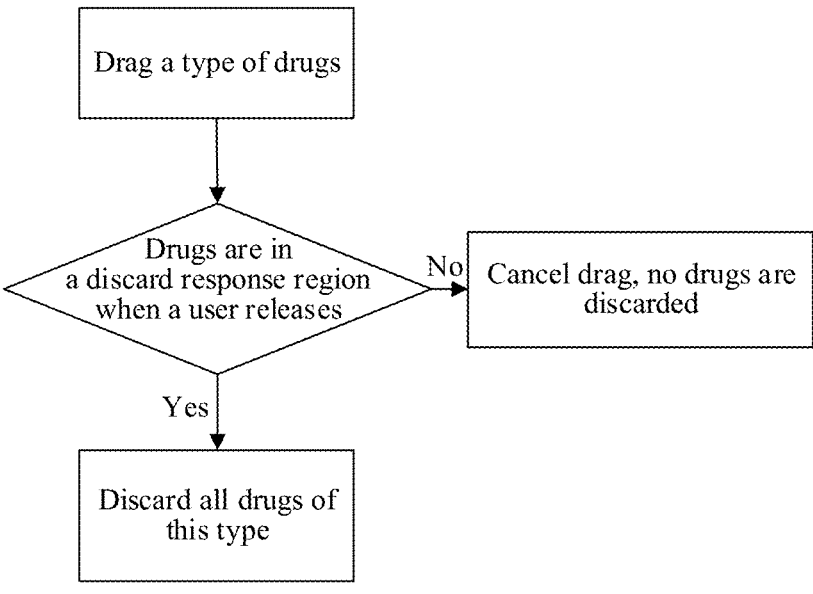
FIG. 9 is a schematic flowchart of a virtual item processing method according to an embodiment of this application.

For example, refer to FIG. 9. FIG. 9 is a flowchart of a virtual item processing method according to an embodiment of this application. As shown in FIG. 9, when a user's drag operation on a type of drugs in a drug list in a discard status is received, whether the drugs fall in a discard response region when a user releases is determined. When the drugs do not fall in the discard response region, the drag operation is canceled and no drugs are discarded at this time. When the drugs fall in the discard response region, a virtual object is controlled to discard all drugs of this type.

When the user drags a drug, the user may also simultaneously operate some fight controls (such as a fire button and a jump button) displayed in the first-level fight interface, for example, the user may simultaneously click a joystick to control the movement of the virtual object.

A process of determining a status when the drug list is folded continues to be described below.

Figure 10:
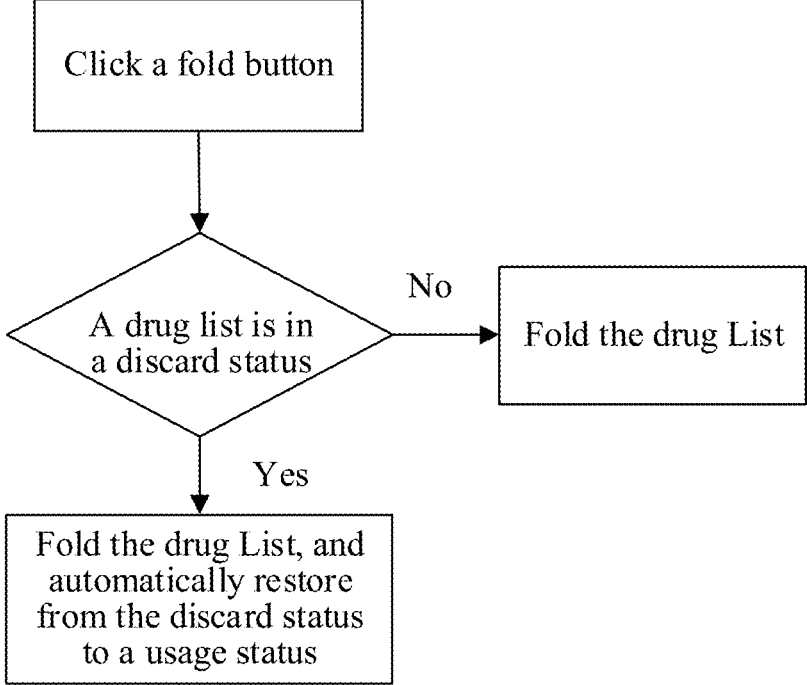
FIG. 10 is a schematic flowchart of a virtual item processing method according to an embodiment of this application.

For example, refer to FIG. 10. FIG. 10 is a schematic flowchart of a virtual item processing method according to an embodiment of this application. As shown in FIG. when a user's click operation on a fold button is received, whether a drug list is currently in a discard status is determined. When the drug list is not in the discard status, the drug list is directly folded. When the drug list is in the discard status, the drug list is folded, and the drug list is controlled to switch from the discard status to a usage status (that is, when the user clicks the fold button, the drug list automatically restores to the usage status, and a drug in the drug list is clicked as a usage drug in the usage status).

In conclusion, the virtual item processing method provided in the embodiments of this application has the following beneficial effects:

1) Portable: User's operation steps of discarding virtual items during flight are reduced, time costs for the user to search drugs or missiles in a backpack are reduced, and operation efficiency is improved;

2) Intuitive: The user may directly discard virtual items in the first-level fight interface, and quickly throw drugs or grenades to teammates with residual blood during firelight, thereby reducing a probability of injury in flight and increasing a possibility of fight victory, that is, user's operation steps are simplified as much as possible to increase a possibility of fight victory and further improve user's gaming experience.

The following continues to explain an exemplary structure of a virtual item processing apparatus 465 implemented as software modules according to the embodiments of this application. In some embodiments, as shown in FIG. 2, the software modules of the virtual item processing apparatus 465 stored in the memory 460 may include: a display module 4651 and a control module 4652.

The display module 4651 is configured to display a virtual scene, where the virtual scene includes a first virtual object and an entry to a first virtual item list. The display module 4651 is further configured to display the first virtual item list in the virtual scene in response to a trigger operation on the entry to the first virtual item list, where the first virtual item list includes at least one type of virtual items owned by the first virtual object; and The control module 4652 is configured to control the first virtual object to discard at least one virtual item of any type in response to a first selection operation on the any type of virtual items in the first virtual item list.

In some embodiments, the display module 4651 is further configured to display a status control, where the status control is used for switching a status of the first virtual item list when triggered and representing different statuses in a differential display mode, and types of the status include: a discard status and a usage status, where the discard status is a status in which any type of virtual items is selected for discard, and the usage status is a status in which any type of virtual items is selected for use.

In some embodiments, the virtual item processing apparatus 465 further includes a switching module 4653, configured to switch the status control to a display mode corresponding to the discard status in response to a trigger operation on the status control, to represent that the status of the first virtual item list has been switched from the usage status to the discard status, and to perform the processing of controlling the first virtual object to discard at least one virtual item of any type in response to a trigger operation on the any type of virtual items in the first virtual item list.

In some embodiments, a default status of the first virtual item list is one of the following: the discard status, the usage status, a status when the first virtual item list was folded last time, a status with a highest usage frequency in the discard status and the usage status, and a status with longest usage duration in the discard status and the usage status.

In some embodiments, the display module 4651 is further configured to perform one of the following processing: displaying the first virtual item list in the virtual scene for each type of virtual items owned by the first virtual object, where the first virtual item list includes one virtual item of each type; and display the first virtual item list in the virtual scene for a quantity of each type of virtual items owned by the first virtual object, where the first virtual item list includes the remaining quantity of each type of virtual items.

In some embodiments, types of the first selection operation include: a click operation and a drag operation; and the control module 4652 is further configured to control the first virtual object to discard a preset quantity of virtual items of any type in response to the click operation on the any type of virtual items in the first virtual item list, and control the first virtual object to discard all quantities of virtual items of any type in response to the drag operation of dragging the any type of virtual items in the first virtual item list to a ground region in the virtual scene.

In some embodiments, the virtual item processing apparatus 465 further includes a determination module 4654, configured to determine, for each click operation, the preset quantity of virtual items of any type discarded by the first virtual object in one of the following ways: determining a set quantity as the preset quantity of virtual items of any type discarded by the first virtual object in response to a quantity setting operation; and obtaining a remaining quantity of virtual items of any type in the first virtual item list, and determining a product of the remaining quantity and a discard coefficient as the preset quantity of virtual items of any type discarded by the first virtual object.

In some embodiments, the display module 4651 is further configured to perform at least one of the following processing: updating the remaining quantity of virtual items of any type in the first virtual item list to a remaining quantity after a discarded quantity is subtracted; displaying the any type of virtual items in the ground region of the virtual scene; displaying first prompt information in the virtual scene, where the first prompt information is used for prompting that the any type of virtual items is not to be automatically picked up; and displaying a pick list in the virtual scene, and displaying the any type of discarded virtual items in the pick list.

In some embodiments, the virtual item processing apparatus 465 further includes an application module 4655, configured to perform the following processing for any type of virtual item in the first virtual item list: when the remaining quantity of virtual items of any type is not zero, applying a color mode to the any type of virtual items; and when the remaining quantity of virtual items of any type decreases to zero, applying a gray mode to the any type of virtual items, where the gray mode represents that the any type of virtual items has been completely discarded and cannot be further discarded.

In some embodiments, the first selection operation is an operation of selecting any type of virtual items for discard, and an operation mode of the first selection operation includes: a slide operation in a first direction, or a first click operation on the any type of virtual items; the control module 4652 is further configured to control the first virtual object to use at least one virtual item of any type in response to a second selection operation on the any type of virtual items in the first virtual item list, where the second selection operation is an operation of selecting the any type of virtual items for use, and an operation mode of the second selection operation includes: a slide operation in a second direction, or a second click operation on the any type of virtual items, where a click region or a number of clicks corresponding to the second click operation is different from that corresponding to the first click operation.

In some embodiments, the display module 4651 is further configured to display the first virtual item list formed by at least one type of virtual items owned by the first virtual object in order in the virtual scene, where the display order of the at least one type of virtual items includes at least one of the following: an order of a remaining quantity of each type of virtual items from high to low; an order of a usage frequency of each type of virtual items from high to low; an order of the difference between the last usage time of each type of virtual items and the current time from small to large; and an order of a usage probability of each type of virtual items from high to low.

In some embodiments, the determination module 4654 is further configured to determine the usage probability of each type of virtual items in the following way: performing feature extraction on environmental information of the virtual scene, status parameters of the first virtual object, attribute information of virtual objects included in a first camp to which the first virtual object belongs, attribute information of virtual objects included in a second camp, and respective functions of each type of virtual items, and calling a machine learning model based on the extracted feature information for predictive processing to obtain the usage probability of each type of virtual items, where the first camp to which the first virtual object belongs and the second camp are hostile camps; the machine learning model is obtained by training environmental information of a sample virtual scene extracted from historical operation data of an expert account, status parameters of a sample virtual object controlled by the expert account, attribute information of other objects included in a camp to which the sample virtual object belongs, attribute information of objects included in a hostile camp against the camp to which the sample virtual object belongs, and labeled data; the level of the expert account is greater than a level threshold; and the labeled data includes types of virtual items used by the sample virtual object that is controlled by the expert account in an interaction process.

In some embodiments, the virtual item processing apparatus 465 further includes an update module 4656, configured to update a display mode of a type of virtual items required by a second virtual object in the first virtual item list in response to appearance of the second virtual object in the virtual scene, the updated display mode being prominent to display modes of other types of virtual items in the first virtual item list, where the second virtual object is an object that needs item support from the first virtual object, or an object that needs item exchange with the first virtual object.

In some embodiments, the determination module 4654 is further configured to determine a virtual object in the virtual scene that has a distance less than a distance threshold from the first virtual object and a status parameter lower than a parameter threshold as the virtual object that needs item support from the first virtual object; and determine virtual items of a remaining quantity less than a quantity threshold among the at least one type of virtual items owned by the first virtual object, and determine a virtual object in the virtual scene that holds the virtual items of a quantity greater than the quantity threshold as the object that needs item exchange with the first virtual object.

In some embodiments, the update module 4656 is further configured to update a display mode of a recommended discard type of virtual items in the first virtual item list when the first virtual object currently cannot reach a required movement speed, where the updated display mode is prominent to the display modes of other types of virtual items in the first virtual item list, and the recommended discard type is a type of virtual items recommended to be discarded to reduce the load of the first virtual object, so as to reach the required movement speed; and the display module 4651 is further configured to display second prompt information when a virtual weight of virtual items that the first virtual object is controlled to discard can enable the first virtual object to reach the required movement speed, where the second prompt information is used for prompting that the current movement speed of the first virtual object has reached the required movement speed, and that there is no need to discard virtual items.

In some embodiments, the first virtual item list is a list dedicated to selecting and discarding any type of virtual items; the display module 4651 is further configured to display a second virtual item list in the virtual scene in response to a trigger operation on an entry to the second virtual item list, where the second virtual item list includes at least one type of virtual items owned by the first virtual object, and the second virtual item list is a list dedicated to selecting and using any type of virtual items; and the control module 4652 is further configured to control the first virtual object to use at least one virtual item of any type in response to a third trigger operation on the any type of virtual items in the second virtual item list.

The description of the apparatus embodiment of this application is similar to the description of the foregoing method embodiment, and the apparatus embodiment has beneficial effects similar to those of the method embodiment, and therefore is not described in detail. The technical details not described in the virtual item processing apparatus provided in the embodiments of this application may be understood according to the explanation of any of FIG. 3, FIG. 5A, or FIG. 5B.

An embodiment of this application provides a computer program product or computer program, the computer program product or computer program including computer instructions (namely, executable instructions), and the computer instructions being stored in a non-transitory computer-readable storage medium. A processor of an electronic device reads the computer instructions from the computer-readable storage medium, the processor executes the computer instructions, and the electronic device is enabled to perform the virtual item processing method described in the embodiments of this application.

An embodiment of this application provides a non-transitory computer-readable storage medium storing executable instructions that, when executed by a processor, enable the processor to perform the virtual item processing method provided in the embodiments of this application, for example, the virtual item processing method shown in FIG. 3, FIG. 5A, or FIG. 5B.

In some embodiments, the computer-readable storage medium may be a memory such as an FRAM, an ROM, a PROM, an EPROM, an EEPROM, a flash memory, a magnetic surface memory, a compact disc, or a CD-ROM; or may be various devices including one of or any combination of the foregoing memories.

In some embodiments, the executable instructions may be in a form of programs, software, software modules, scripts, or code, may be written in any form of programming language (including compiled or interpreted languages, or declarative or procedural languages), and may be deployed in any form, including being deployed as standalone programs or as modules, components, subroutines, or other units suitable for use in computing environments.

For example, the executable instructions may, but not necessarily, correspond to a file in a file system, and may be stored in a part of the file for saving other programs or data, for example, stored in one or more scripts in a hyper text markup language (HTML) document, stored in a single file specifically used for a discussed program, or stored in a plurality of collaborative files (for example, files storing one or more modules, subroutines, or code parts). In this application, the term "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module can be implemented using one or more processors (or processors and memory). Likewise, a processor (or processors and memory) can be used to implement one or more modules. Moreover, each module can be part of an overall module that includes the functionalities of the module.

As an example, the executable instructions may be deployed to execute on an electronic device, or on a plurality of electronic devices in a single location, or on a plurality of electronic devices distributed in a plurality of locations and interconnected through a communication network.

The foregoing descriptions are merely embodiments of this application and are not intended to limit the protection scope of this application. Any modifications, equivalent replacements, improvements, and the like made within the spirit and scope of this application fall within the protection scope of this application.

What is claimed is:

1. A virtual item processing method performed by an electronic device, the method comprising:

displaying a virtual scene, the virtual scene including an entry to a first virtual item list associated with a first virtual object;

in response to a trigger operation on the entry to the first virtual item list, displaying the first virtual item list in the virtual scene and a status control for switching a current status of the first virtual item list between a discard status and a usage status, the first virtual item list including at least one type of virtual items owned by the first virtual object and the current status of the first virtual item list being the discard status indicating that any type of virtual items is selected for discard;

in response to a first selection operation on one type of virtual items in the first virtual item list, discarding at least one virtual item associated with the selected type of virtual items; and in response to a collapsing operation on the entry to the first virtual item list, switching the first virtual item list from the discard status to the usage status and collapsing the first virtual item list.

2. The method according to claim 1, wherein the discarding at least one virtual item associated with the selected type of virtual items comprises:

discarding a preset quantity of virtual items of the selected type in response to a click operation on the selected type of virtual items in the first virtual item list.

3. The method according to claim 1, wherein the discarding at least one virtual item associated with the selected type of virtual items comprises:

discarding all quantities of virtual items of the selected type in response to a drag operation of dragging the selected type of virtual items in the first virtual item list to a ground region in the virtual scene.

4. The method according to claim 1, wherein the method further comprises:

in accordance with a determination that a number of virtual items of any type is not zero, applying a first color mode to the type of virtual items; and in accordance with a determination that the number of the type decreases to zero, applying a second color mode to the type of virtual items, the second color mode being visually different from the first color mode.

5. The method according to claim 1, wherein the method further comprises:

controlling the first virtual object to use at least one virtual item of a type in response to a second selection operation on the selected type of virtual items in the first virtual item list, an operation mode of the second selection operation comprising: a slide operation in a second direction, or a second click operation on the any type of virtual items, a click region or a number of clicks corresponding to the second click operation being different from that corresponding to the first click operation.

6. An electronic device, comprising:

a memory, configured to store executable instructions; and a processor, configured to implement, when executing the executable instructions stored in the memory, a virtual item processing method including:

displaying a virtual scene, the virtual scene including an entry to a first virtual item list associated with a first virtual object;

in response to a trigger operation on the entry to the first virtual item list, displaying the first virtual item list in the virtual scene and a status control for switching a current status of the first virtual item list between a discard status and a usage status, the first virtual item list including at least one type of virtual items owned by the first virtual object and the current status of the first virtual item list being the discard status indicating that any type of virtual items is selected for discard;

in response to a first selection operation on one type of virtual items in the first virtual item list, discarding at least one virtual item associated with the selected type of virtual items; and in response to a collapsing operation on the entry to the first virtual item list, switching the first virtual item list from the discard status to the usage status and collapsing the first virtual item list.

7. The electronic device according to claim 6, wherein the discarding at least one virtual item associated with the selected type of virtual items comprises:

discarding a preset quantity of virtual items of the selected type in response to a click operation on the selected type of virtual items in the first virtual item list.

8. The electronic device according to claim 6, wherein the discarding at least one virtual item associated with the selected type of virtual items comprises:

discarding all quantities of virtual items of the selected type in response to a drag operation of dragging the selected type of virtual items in the first virtual item list to a ground region in the virtual scene.

9. The electronic device according to claim 6, wherein the method further comprises:

in accordance with a determination that a number of virtual items of any type is not zero, applying a first color mode to the type of virtual items; and in accordance with a determination that the number of the type decreases to zero, applying a second color mode to the type of virtual items, the second color mode being visually different from the first color mode.

10. The electronic device according to claim 6, wherein the method further comprises:

controlling the first virtual object to use at least one virtual item of a type in response to a second selection operation on the selected type of virtual items in the first virtual item list, an operation mode of the second selection operation comprising: a slide operation in a second direction, or a second click operation on the any type of virtual items, a click region or a number of clicks corresponding to the second click operation being different from that corresponding to the first click operation.

11. A non-transitory computer-readable storage medium, storing executable instructions that, when executed by a processor of an electronic device, causes the electronic device to implement a virtual item processing method including:

displaying a virtual scene, the virtual scene including an entry to a first virtual item list associated with a first virtual object;

in response to a trigger operation on the entry to the first virtual item list, displaying the first virtual item list in the virtual scene and a status control for switching a current status of the first virtual item list between a discard status and a usage status, the first virtual item list including at least one type of virtual items owned by the first virtual object and the current status of the first virtual item list being the discard status indicating that any type of virtual items is selected for discard;

in response to a first selection operation on one type of virtual items in the first virtual item list, discarding at least one virtual item associated with the selected type of virtual items; and in response to a collapsing operation on the entry to the first virtual item list, switching the first virtual item list from the discard status to the usage status and collapsing the first virtual item list.

12. The non-transitory computer-readable storage medium according to claim 11, wherein the discarding at least one virtual item associated with the selected type of virtual items comprises:

discarding a preset quantity of virtual items of the selected type in response to a click operation on the selected type of virtual items in the first virtual item list.

13. The non-transitory computer-readable storage medium according to claim 11, wherein the discarding at least one virtual item associated with the selected type of virtual items comprises:

discarding all quantities of virtual items of the selected type in response to a drag operation of dragging the selected type of virtual items in the first virtual item list to a ground region in the virtual scene.

14. The non-transitory computer-readable storage medium according to claim 11, wherein the method further comprises:

in accordance with a determination that a number of virtual items of any type is not zero, applying a first color mode to the type of virtual items; and in accordance with a determination that the number of the type decreases to zero, applying a second color mode to the type of virtual items, the second color mode being visually different from the first color mode.

15. The non-transitory computer-readable storage medium according to claim 11, wherein the method further comprises:

controlling the first virtual object to use at least one virtual item of a type in response to a second selection operation on the selected type of virtual items in the first virtual item list, an operation mode of the second selection operation comprising: a slide operation in a second direction, or a second click operation on the any type of virtual items, a click region or a number of clicks corresponding to the second click operation being different from that corresponding to the first click operation.

* * * * *